United States Patent [19]

Jaworski

[11] Patent Number: 4,747,466

[45] Date of Patent: May 31, 1988

[54] IMPACT TOOL

[76] Inventor: Bill L. Jaworski, 1257 S. Yank Ct., Lakewood, Colo. 80228

[21] Appl. No.: 838,570

[22] Filed: Mar. 11, 1986

Related U.S. Application Data

[60] Division of Ser. No. 529,884, Sep. 6, 1983, Pat. No. 4,577,547, which is a continuation-in-part of Ser. No. 402,291, Jul. 27, 1982, abandoned.

[51] Int. Cl.$^4$ .......................... G01V 1/04; G01V 1/38
[52] U.S. Cl. .................................... 181/120; 181/113; 367/83; 367/146
[58] Field of Search .............. 181/105, 106, 108, 110, 181/113, 119, 120, 139, 142; 367/15, 25, 83, 911, 912, 146; 175/40, 50; 166/250; 73/151, 152

[56] References Cited

U.S. PATENT DOCUMENTS

| | | | |
|---|---|---|---|
| 3,205,790 | 9/1961 | Bollar | 72/20 |
| 3,221,833 | 5/1962 | Malmberg | 181/106 |
| 3,267,777 | 8/1966 | Bollar | 60/54.5 |
| 3,277,437 | 4/1965 | Bouyoucos | 367/143 |
| 3,433,202 | 3/1969 | Sharp et al. | 181/120 |
| 3,642,089 | 2/1972 | Parker et al. | 181/120 |
| 3,721,311 | 3/1970 | Mott-Smith | 181/120 |
| 3,735,823 | 5/1973 | Terada | 173/119 |
| 3,866,690 | 2/1975 | Lance | 173/15 |
| 3,872,934 | 3/1975 | Terada | 173/134 |
| 3,887,019 | 5/1975 | Reynolds | 173/134 |
| 4,181,183 | 1/1980 | Okada | 173/119 |
| 4,253,539 | 3/1981 | Magneville | 181/120 |
| 4,682,309 | 7/1987 | Dedole et al. | 367/146 |

OTHER PUBLICATIONS

The Development and Evaluation of a New Marine Seismic Energy Source: The HP Water Gun, Bill L. Jaworski, May 8, 1975.

*Primary Examiner*—Charles T. Jordan
*Assistant Examiner*—John W. Eldred
*Attorney, Agent, or Firm*—W. Scott Carson

[57] ABSTRACT

An impact tool for linearly accelerating a mass such as in a jack hammer. The tool includes first and second members respectively mounted in sealing relationships in first and second outlets of a chamber. The chamber is initially pressurized with a first quantity of gas which remains constant during the normal operation of the tool. To begin a cycle, the first member is moved toward the second member to sealingly engage the end portions thereof and entrap a first volume of gas therebetween. The volume of the entrapped gas is then reduced by continuing to move the first member. This raises the pressure of the entrapped gas and opens a one-way check valve to place the entrapped gas in fluid communication with the gas in the surrounding chamber. Forward movement of the first member is then stopped which again seats the check valve wherein movement of the first member is reversed so that it moves away from the second member. This movement is continued until the pressure of the remaining entrapped gas between the two members is reduced sufficiently below the pressure in the surrounding chamber that the net force on the second member causes it to follow the first to a restored position. The tool is then fired by placing the remaining entrapped gas in fluid communication with the higher pressure gas in the surrounding chamber. Adaptations of the basic invention for use as a seismic energy source in an ambient liquid under high pressure such as in a wellbore are also disclosed.

21 Claims, 14 Drawing Sheets

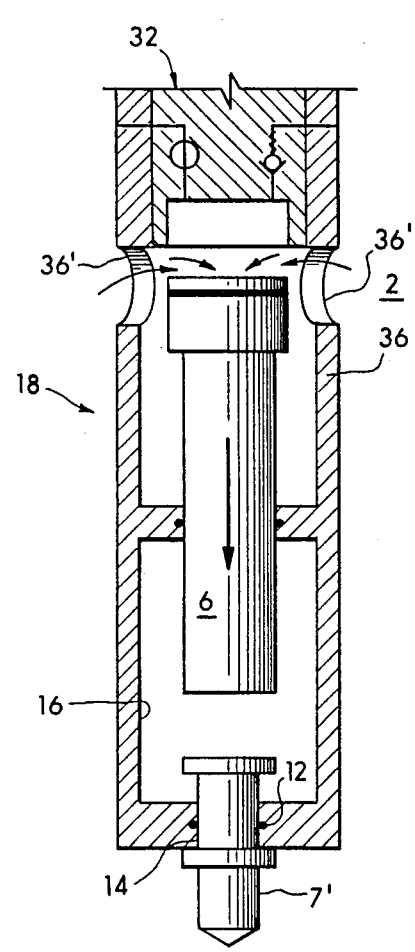
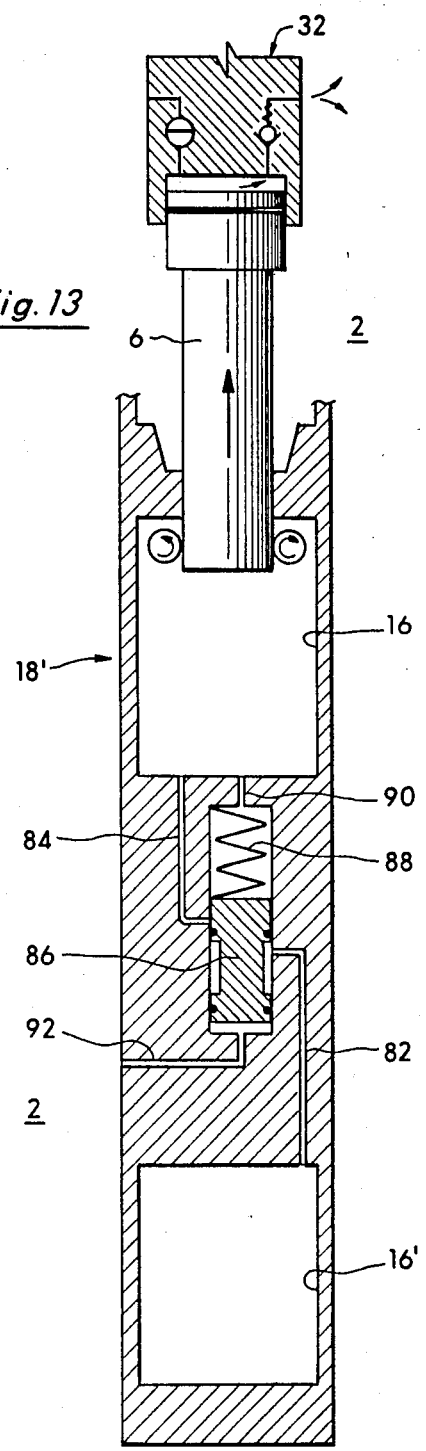

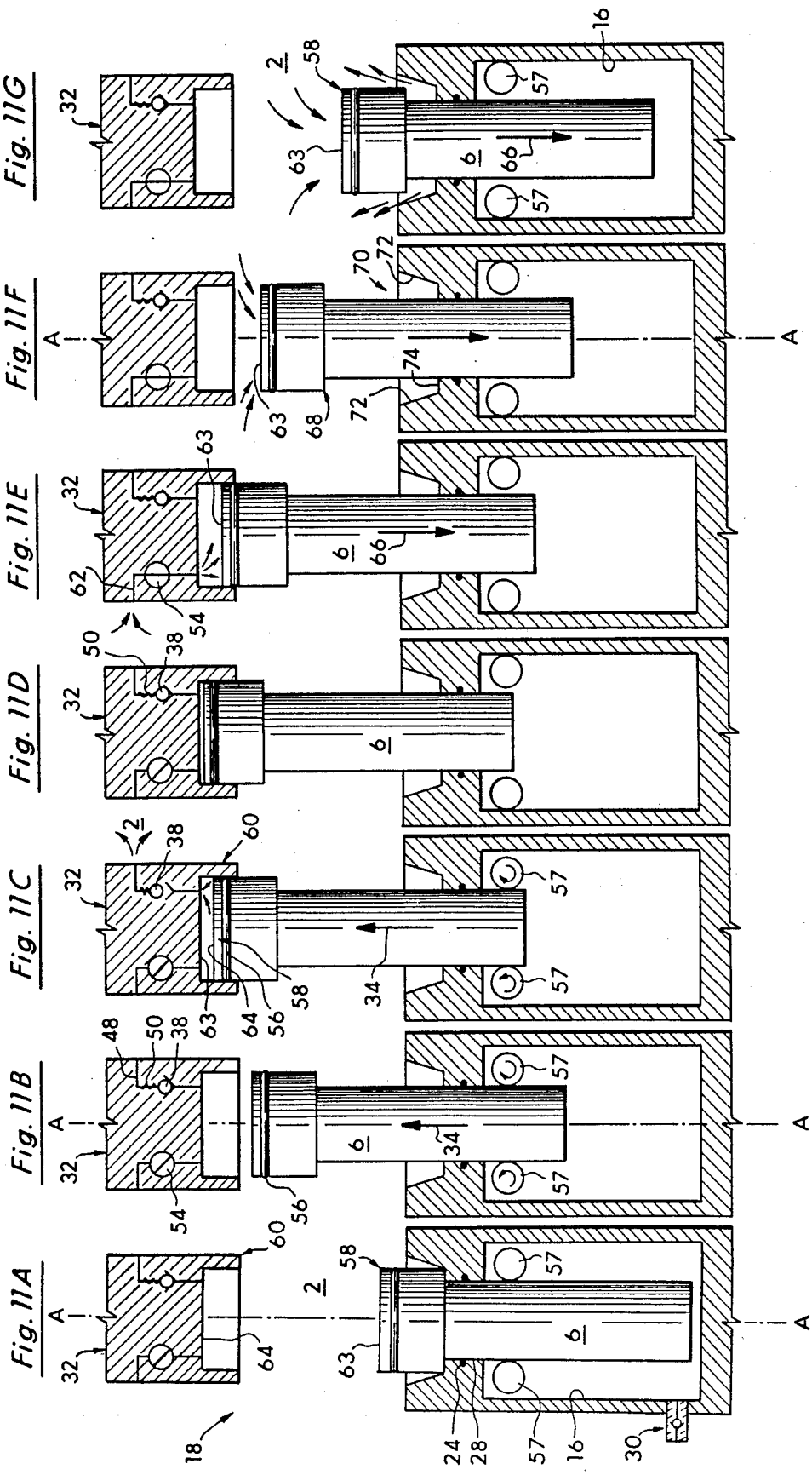

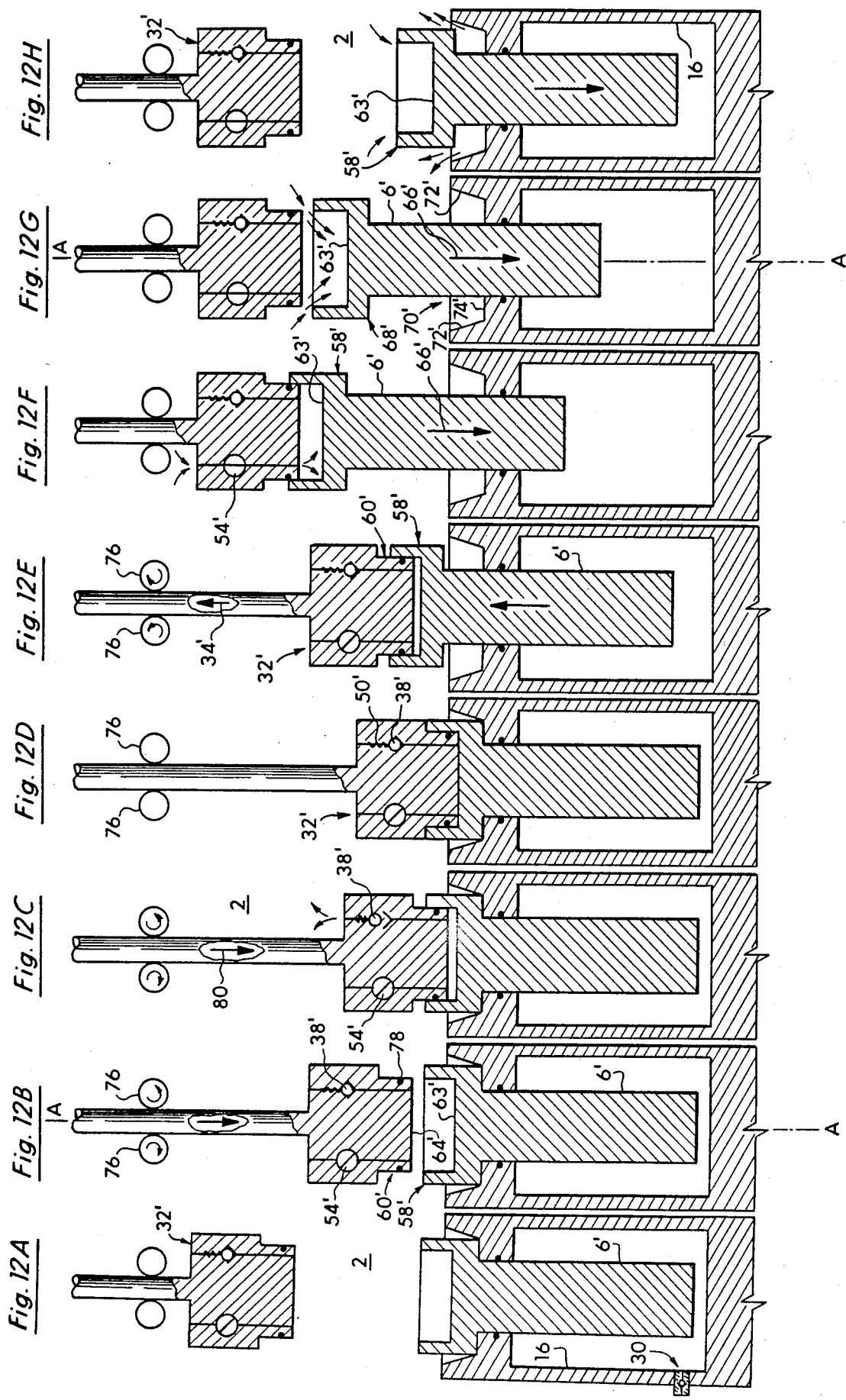

IMPACT TOOL

RELATED APPLICATIONS

This application is a division of U.S. Patent application Ser. No. 529,884 filed Sept. 6, 1983, now U.S. Pat. No. 4,577,547, which is a continuation-in-part of U.S. Patent application Ser. No. 402,291 filed July 27, 1982, now abandoned.

FIELD OF THE INVENTION

This invention relates to the field of impact tools and similar devices which linearly accelerate a mass under the force of a fluid under pressure.

BACKGROUND OF THE INVENTION AND PRIOR ART a. FIGS. 1-8

Conventional impact tools such as jack hammers and pile driver typically use a combination of hydraulic and pneumatic fluids to operate the device. In the more common designs, the hydraulic and pneumatic fluids act against opposite sides of a common piston with the hydraulic fluid being used to restore (i.e., move the piston to compress the pneumatic fluid or gas) whereupon the device is fired and the piston is accelerated under the force of the compressed gas.

In the most common and perhaps simplest prior art design, hydraulic fluid under pressure is used to restore the piston and compress the gas whereupon the hydraulic fluid is then vented to initiate the power stroke (i.e., the portion of the cycle in which the piston is accelerated under the force of the compressed gas). However, the inherent viscosity and mass of the hydraulic fluid makes it resist rapid flow and acceleration with the result that undesirable back pressure is generated on the piston. This back pressure resists and thus reduces the piston's acceleration under the force of the compressed gas. Further, if acceptable rapid flow is obtained, the accompanying result is often the entrapment of air in the hydraulic fluid which reduces its performance characteristics. Attempts to overcome these problems generally rely upon reducing the volume of hydraulic fluid involved per cycle by reducing the effective piston area on which it operates. However, this reduction results in the need to use higher hydraulic pressures to obtain a given operating pressure for the compressed gas in order to achieve a desired acceleration of the piston. Alternately, a lower gas pressure can be used to achieve the desired acceleration but the piston area against which the gas operates must then be enlarged. Both solutions create undesirable side effects as in the first instance, the strength of the tool must be increased to handle the higher hydraulic pressures and in the second instance, the size of the tool must be increased which increases its weight and may well make the tool unwieldy. Other attempts to overcome the venting and acceleration problems of the hydraulic fluid during the power stroke include increasing the size of the hydraulic outlet at the vent and using valves that reduce the viscous losses associated with the rapid discharge of hydraulic fluid from the system; but, such solutions are often impractical because of the added cost, complexity, and weight to the tool.

In other common designs of impact tools, the problems associated with venting and accelerating the hydraulic fluid during the power stroke are avoided by venting the hydraulic fluid prior to the initiation of the power stroke. However, such alternate approaches have numerous drawbacks. Chief among these is the need to retain the piston at its restored position before firing while the hydraulic fluid is removed. This is traditionally done mechanically or by isolating the piston from the compressed gas until the firing step is initiated. To accomplish this, secondary hydraulic systems or other arrangements must be included in the tool to drain the hydraulic fluid prior to firing. Such retaining and draining mechanisms add complexity and weight to the tool not to mention the additional time that must be added to the cycle to accommodate the separate venting stage after the piston has been restored. Further, in some designs that retain the piston by isolating it from the compressed gas rather than mechanically holding it, efficiency is often reduced because in isolating the piston, a small volume of compressed gas becomes trapped and must be vented. Such venting not only wastes the energy of the trapped gas but also requires that additional gas periodically be added to the system.

Examples of these and other prior art approaches include U.S. Pat. Nos. 4,181,183 to Okada, 3,878,019 to Reynolds, 3,872,934 to Terada, 3,866,690 to Lance, 3,735,823 to Terada, 3,267,677 to Bollar, and 3,205,790 to Bollar.

In a marked change from these prior art approaches, the present inventor earlier invented a design which avoided the hydraulic fluid problems outlined above. In his prior approach, the present inventor provided a chamber with first and second members sealingly mounted in opposing outlets of the chamber for movement toward and away from each other along a common axis. In operation, the chamber was pressurized with a compressed gas and the first member was forced into the chamber until it contacted and made a face seal with the second member. Once the faces of the two members were in contact, the motion was stopped and a valve was opened and left open to vent the gas trapped between the two faces of the two members to the atmosphere. After a delay to insure the venting had been accomplished, the first member was then retracted wherein the second member followed because the effective area on the second member exposed to the compressed gas within the chamber was such as to create a net force in the direction of movement of the first member. To fire the device, the venting valve of the first member was then closed and a triggering valve in the first member was opened to allow compressed gas from the chamber to enter the volume between the sealed faces of the first and second members. As the pressure in this volume increased, the forces on the second member overcame the forces tending to hold the second member against the first and the faces separated. Once the faces separated, the face seal between them was broken and the force on the air piston due to the compressed gas accelerated the second member away from the first along the common axis.

Although this prior approach of the present inventor avoided the problems associated with venting and accelerating the hydraulic fluid in the previous designs of others, it too had several drawbacks. Specifically, everytime the device was restored, a volume of compressed gas was lost through the venting step to the atmosphere thereby requiring a supply of compressed gas to replenish the lost volume. This supply made the device impractical for many applications because of the need for a compressor to continually restore the lost gas. The operation also required the venting valve to remain open to the atmosphere during the restoring of the second member since even minor leaks in the face seal between the members or in the triggering valve would result in a premature firing of the device. Further, any such leakage in the face seal or in the triggering valve resulted in additional loses of compressed gas and a need for a larger supply of compressed gas to replace losses. Another drawback was that the face seal and the valve seals were exposed to the difference between the maximum operating pressure (e.g., 600–1000 psi) and atmospheric pressure during each cycle. Consequently, this high differential pressure required close tolerances and expensive, special valving and often resulted in unreliable operation at high pressures. The inclusion of two valves in the first member also required space allowances for the valve housing which increased size, weight, and complexity. Connectors for actuating the valves added even more complexity and weight. Finally, the pause or delay at the end of the stroke when the faces of the two members were sealed to allow for the actuation of the venting valve and the venting step itself made the device impractical for operation with electric or hydraulic motors and for high speed applications.

It was with the deficiencies and drawbacks of these prior art approaches in mind that the present invention was developed. With the tool of the present invention, the need to vent compressed gas to the atmosphere or outside the working chamber has been avoided thus eliminating the need to continually recharge the working chamber to compensate for the discharged gas. Further, in the preferred embodiments of the invention, the critical seals between the two main moving parts of the tool need only to be exposed to a minimal differential pressure to operate the tool wherein higher overall pressures can be used for maximum acceleration of the hammer member. Additionally, the need for providing elaborate and bulky valves on one of the two, main working members as in the inventor's prior approach has been eliminated reducing the cost, complexity, and size requirements of the tool. Also, the need for the pause or delay to properly seal the two working members prior to the restoring stroke of the inventor's previous device has also been eliminated making the new tool adaptable for operation by electric or hydraulic motors and for high speed applications.

b. FIGS. 9–13

In regard to the adaptations of the basic invention for use as a wellbore seismic energy source, previous attempts in this area have generally used modified forms of existing marine devices. These attempts have been at best marginally effective. The principal reason for the lack of success has been the inability of conventional marine source techniques (e.g., waterguns) to operate effectively in the high hydrostatic pressures encountered at depth in a wellbore. At hydrostatic heads on the order of a hundred times greater than encountered in a typical marine environment, the resulting seismic signal is unsatisfactory and logistical problems can be prohibitive.

The most pronounced effect of high hydrostatic pressures on the generation of seismic energy is the time compression effect on the resulting signal. The period of the processes involved in seismic energy generation in a fluid is an inverse function of the hydrostatic pressure. As a result of this reduction in period, the primary pulse width, as well as the bubble collapse or oscillation period, is decreased. The decrease in primary pulse width results in a very broad bandwidth, with much of the energy contained in the signal at frequencies which are useless for seismic purposes. The reduction in bubble period results in a low-cut filtering of the energy further effecting the usefulness of the generated acoustic energy.

Mechanical and logistical problems can arise from the increased hydrostatic head, especially with airgun and watergun sources operated using compressed air. Any explosive source or implosive source relying on the explosive or outward acceleration of fluid must first overcome the force exerted by the high hydrostatic pressures. Such devices powered by compressed gas, require gas at pressures significantly above hydrostatic. Handling and supplying gas at the pressures required at depth in a wellbore becomes more difficult and dangerous as the depth of operation increases. The gaslift effect of large quantities of gas vented into the wellbore can significantly reduce the ambient hydrostatic pressure resulting in instability of the generated seismic waveform and the generation of noise uphole from the source. Mechanical or electromechanical devices which involve rapid motion must overcome the potentially high differential pressures generated by rapid motion and the viscosity and mass of the surrounding fluids. Cavitation under hydroplastic heads of thousands of pounds per square inch is improbable, but the subcavitational differential pressures generated can limit the effectiveness of the source.

The essentially one dimensional wellbore prevents significant convergent flow from taking place. This lack of convergent flow especially affects the signature of implosive sources. Waterguns and similar sources rely on convergent flow for most of their low frequency seismic energy. Without the back pressure developed by the convergent flow, the inflowing fluid is not decelerated until the vacuum volume totally collapses. The effect on the resulting signal is an abrupt risetime and a very narrow pulse width.

The development of sources which couple directly to the wellbore wall is currently proceeding. Directly coupling the source to the wall can potentially eliminate the effects of the high hydrostatic pressure on the seismic signal. The greatest difficulty to be overcome using the approach is building a device of sufficient power that will fit in the borehole. Building a vibrator or impact device that is approximately five inches wide, operates under thousands of pounds per square inch pressure and is satisfactorily coupled to the wellbore wall present a number of difficult engineering problems.

The disclosed adaptations of the basic invention for use as a seismic energy source are designed to overcome the inherent difficulties imposed by the conditions in the wellbore. The adaptations use a modified waterhammer approach to obtain the necessary volume acceleration required for the effective generation of acoustic energy in the wellbore fluids. This apprach offers two primary advantages in that the mechanical modification of the time duration/amplitude distribution of the high volume accelerations is possible and rapid outward or explosive acceleration of the wellbore fluids is not necessary. Further, the resulting seismic energy sources can be used with existing surface receiving and recording equipment and conventional wellbore logging equipment.

SUMMARY OF THE INVENTIONS a. FIGS. 1-8

The present invention involves an impact tool for linearly accelerating a mass such as in a jack hammer or pile driver. In the preferred embodiments, the tool includes first and second members respectively mounted in sealing relationships in first and second outlets of a chamber for movement along a common axis toward and away from each other. In operation of the preferred embodiments, the fluid-tight chamber is initially pressurized with a first quantity of gas which remains constant during the normal operation of the tool. To initiate a cycle, the first member is moved along the common axis to a first position relative to the second member. At this position, the end portions of the members are sealingly engaged to entrap a first volume of gas therebetween. The volume of entrapped gas is then reduced by continuing to move the first member toward the second. This raises the pressure of the entrapped gas and substantially at the same time, opens a one-way check valve to place the entrapped gas in fluid communication with the gas in the surrounding chamber. The amount of entrapped gas is thus reduced whereupon movement of the first member toward the second is stopped which again seats the check valve. The first member is then moved away from the second member along the common axis until the pressure of the remaining entrapped gas between the two members is reduced sufficiently below that of the pressure in the surrounding chamber that the net force on the second member makes it follow the first. The tool is then fired by placing the remaining entrapped gas in fluid communication with the higher pressure gas in the surrounding chamber. Once exposed to the higher pressure gas, the second member is accelerated away from the first along the common axis to impact, for example, the chisel of a jack hammer whereupon the first member is again moved toward the second to initiate another cycle.

In a second embodiment, the steps of moving the first member toward the second into a sealing relationship after which the volume of the entrapped gas is reduced are eliminate so that the initial sealing engagement takes place when the volume of gas between the two members is at a minimum. In another embodiment, only one of the two members moves relative to the chamber.

In all of the preferred embodiments, the system is a closed one wherein additional gas does not need to be added to the tool during its operation and the tool can be repeatedly operated in an identical manner from a single, initial charge of compressed gas. Further, in all the preferred embodiments, the volume of the gas entrapped between the facing portions of the first and second members during the restoring portion of each stroke is expanded to reduce the pressure of the entrapped gas below the pressure in the surrounding chamber. In this manner, the accelerated member can be restored and its firing position in a cycle can be accurately determined and controlled.

b. FIGS. 9-13

The present invention also involves adaptations for linearly accelerating a mass in the environment of an ambient liquid under high pressure such as in a wellbore. The adaptations use a charged chamber of gas, however, the mass or piston member is accelerated under the force of the surrounding, high pressure liquid which is at a pressure much greater than the gas. The restoring and firing techniques are similar to the ones of FIGS. 1-8 especially when the adaptations are used in an impact tool. However, when used as seismic energy sources, the principal difference is the controlled deceleration of the piston to create a waterhammer effect in the surrounding liquid to thereby generate an acoustic signal or pulse.

BRIEF DESCRIPTITON OF THE DRAWINGS

FIGS. 3A-H schematically illustrate the operation of the preferred embodiment.

FIGS. 4A-E schematically illustrate the operation of a second embodiment.

FIGS. 5A-D schematically illustrate the operation of a third embodiment.

FIGS. 6A-I schematically illustrate the operation of another embodiment.

FIGS. 7A-F schematically illustrate the operation of another embodiment.

FIGS. 8A-D schematically illustrate the operation of another embodiment which is preferably adapted for use in a jack hammer.

Figure 9:
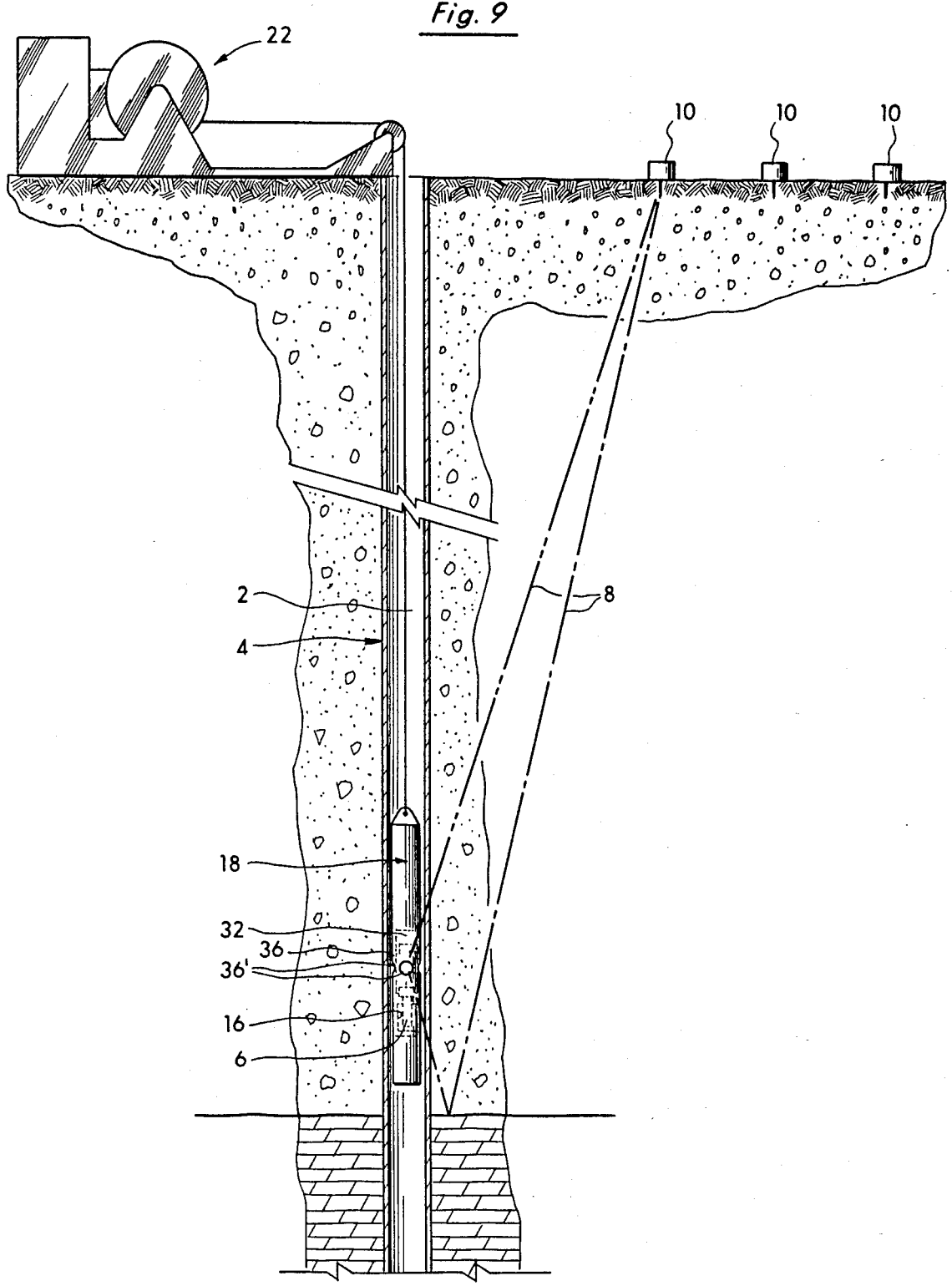

FIG. 9 illustrates a seismic energy source in operation in the environment of a liquid under high pressure such as in a wellbore. This is the preferred application of the embodiments of FIGS. 10—13.

FIG. 10 illustrates a manner in which the embodiments of FIGS. 11-13 can be adapted for use in an impact tool if desired.

FIGS. 11A-G schematically illustrate the operation of an embodiment designed for use as a seismic energy source in the environment of FIG. 9.

FIGS. 12A-H illustrate another embodiment for use in the environment of FIG. 9.

FIG. 13 illustrates an arrangement for adjusting the pressure of the gas in the embodiments of FIGS. 11 and 12 to maintain it at a substantially constant amount below the ambient liquid pressure as the tool is lowered in the wellbore. In this manner, the operation of the tool is more uniform at all depths in the wellbore

DETAILED DESCRIPTION OF THE PREFERRED EMBODIMENTS

I. FIGS. 1-8

Figure 1:
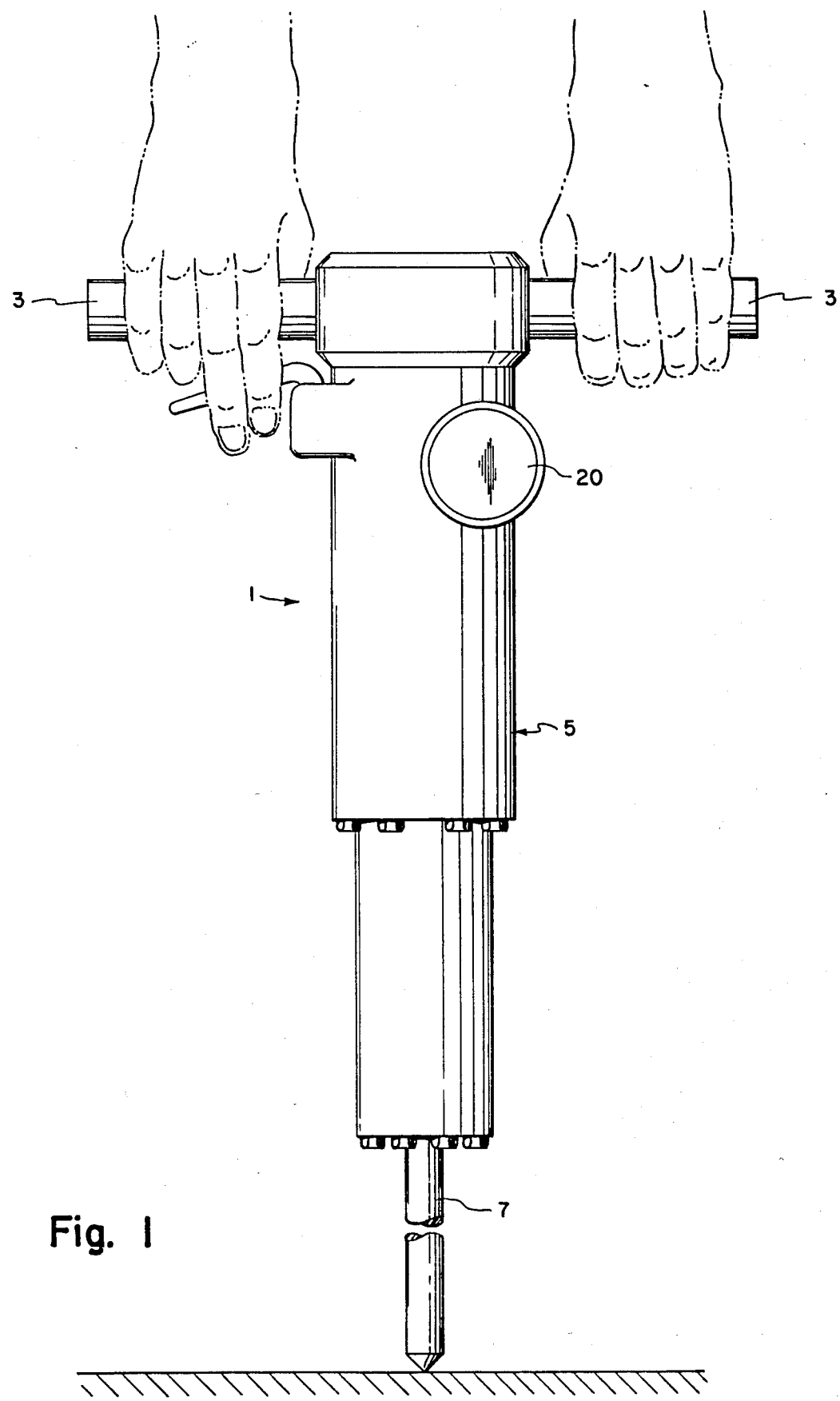
FIG. 1 illustrates a jack hammer which is the preferred application of the embodiments of FIGS. 1-8.
Figure 2:
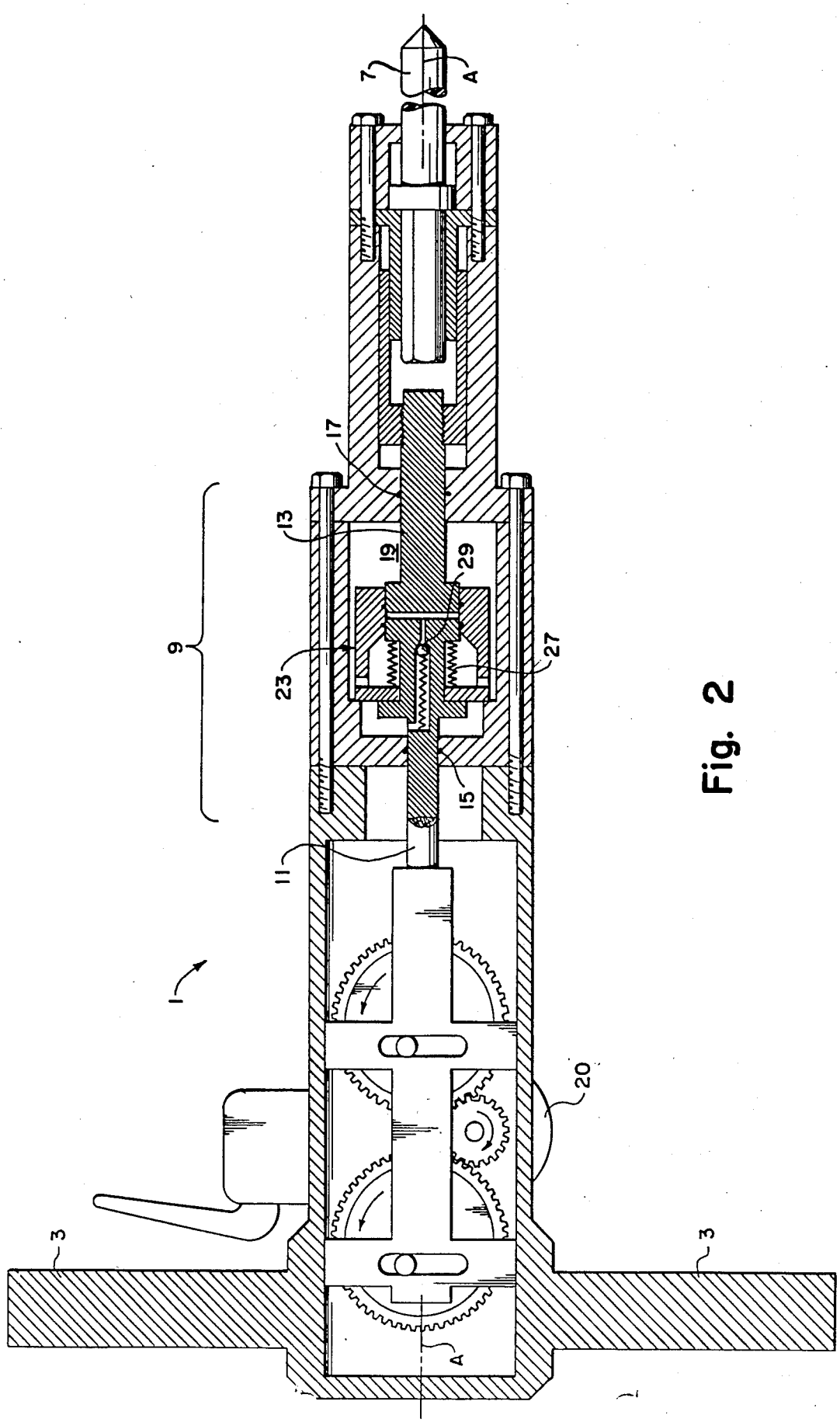
FIG. 2 is a cross-sectional view of FIG. 1 illustrating the preferred embodiment in use in the jack hammer.

FIGS. 1 and 2 illustrate the preferred embodiment of the present invention employed in a jack hammer 1. The jack hammer 1 is of conventional, overall design with handles 3, main body 5, and chisel 7. Positioned within the main body 5 of the jack hammer 1 in the area of 9 in FIG. 2 are members 11 and 13 of the present invention. As shown in FIG. 2, members 11 and 13 are sealingly mounted at 15 and 17 respectively within the chamber 19 for reciprocal movement along a common axis A.

a. Preferred Embodiment of FIGS. 3A-H

In operation of the preferred embodiment as schematically shown in FIGS. 3A-H, the chamber 19 is initially charged or pressurized with a gas through check valve 21. For illustrative purposes, the check valve 21 is only shown in FIG. 3A as once the chamber 19 is charged, the chamber 19 with its sealed outlets at 15 and 17 becomes a closed system with no gas leaving or entering the system during normal operation of the jack hammer 1. In this manner, there is no need to provide an additional supply of compressed air to continuously or periodically re-charge the chamber 19 during normal operation of the tool 1.

Figure 3A:
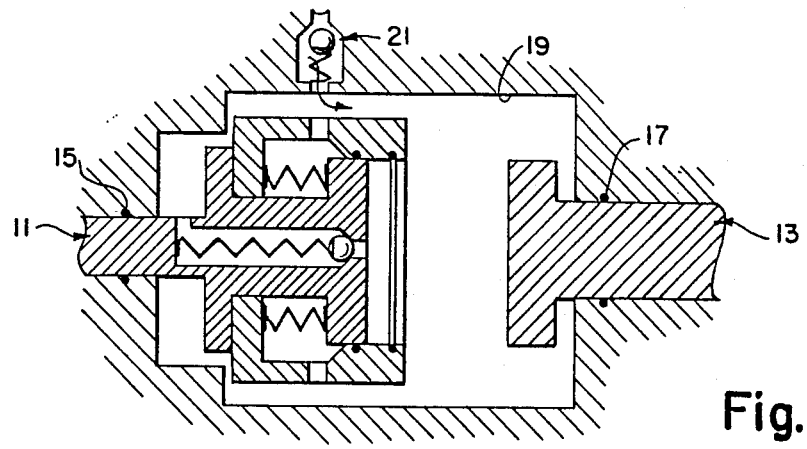
Figure 3B:
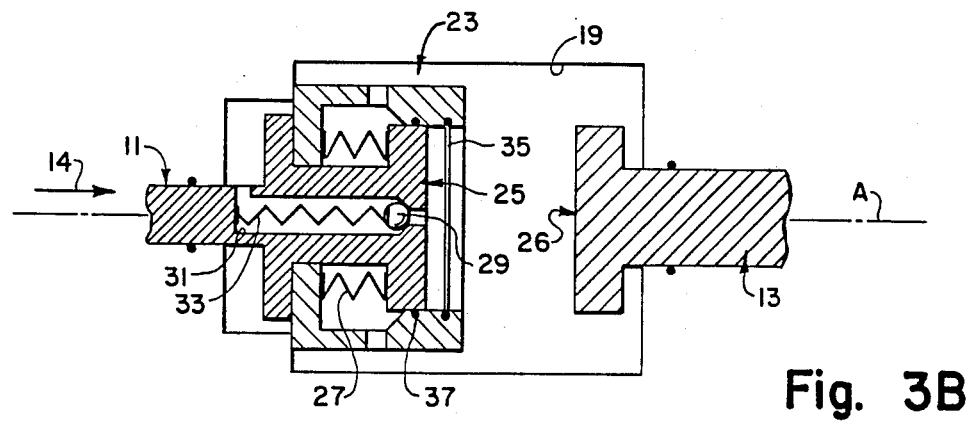
Figure 3C:
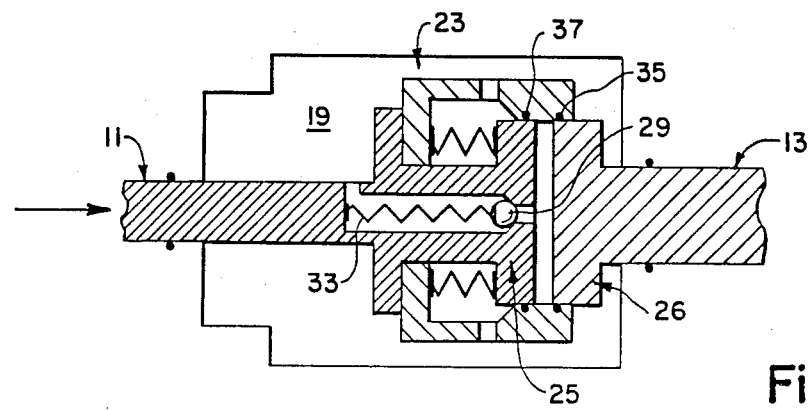
Figure 3D:
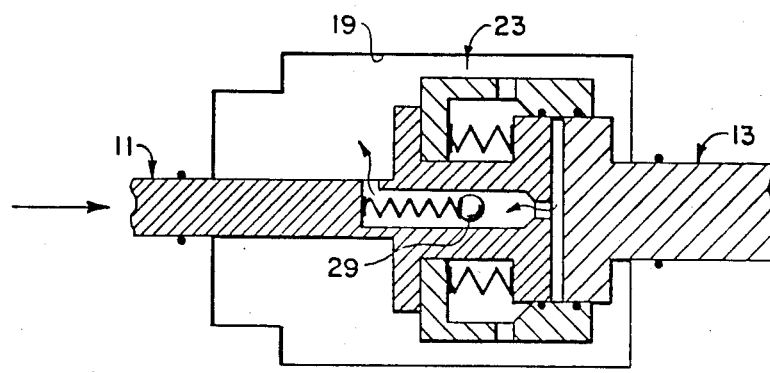

Referring again to FIG. 3A and once the chamber 19 is pressurized, the first or restoring member 11 is moved, for example, by an electric or hydraulic motor (20 in FIGS. 1 and 2) along the common axis A (FIG. 3B) toward the second or hammer member 13 in the direction of arrow 14 as shown in FIG. 3B. In the position of FIG. 3B, the collar member 23 mounted about the end portion 25 of the first member 11 is biased by spring 27 as shown and check valve 29 within the passage 31 of the first member 11 is biased by spring 33 in its closed position. The first member 11 is then advanced until the forward seal 35 on collar member 23 engages the second member 13 as shown in FIG. 3C. At the position of FIG. 3C and with the forward and rearward seals 35 and 37 on the collar member 23 respectively engaging members 11 and 13 and with the check valve 29 seated under the force of spring 33, the end portions 25 and 26 of the members 11 and 13 are sealingly engaged in a first position relative to each other to entrap a first volume of gas therebetween. The first member 11 is then further advanced along the common axis toward the second member 13 which reduces the volume of the entrapped gas raising its pressure and unseating the check valve 29 to place the gas between the end portions 25 and 26 in fluid communication with the gas in the surrounding chamber 19 as illustrated in FIG. 3D.

Figure 3E:
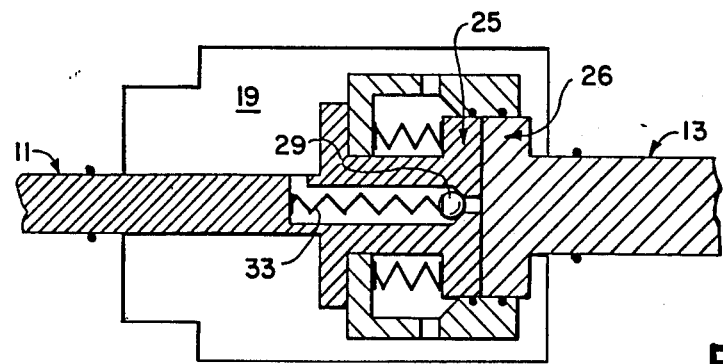
Figure 3F:
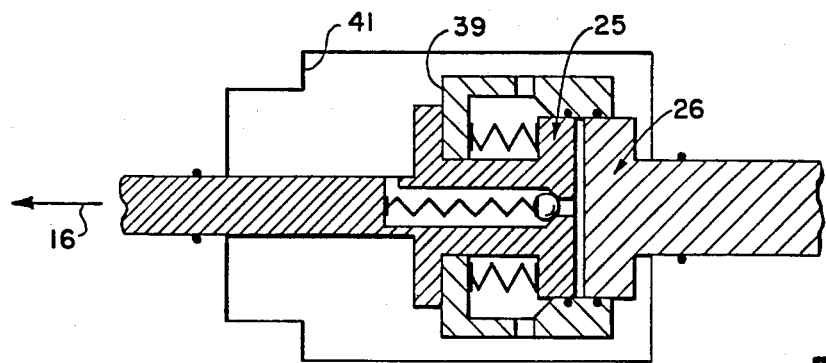
Figure 3G:
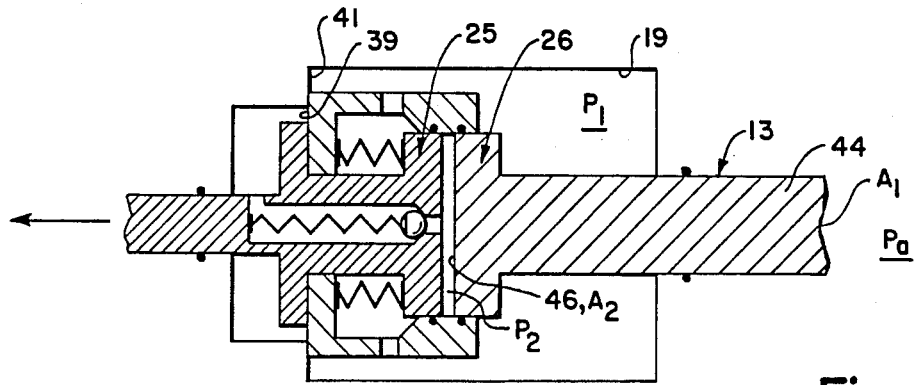
Figure 3H:
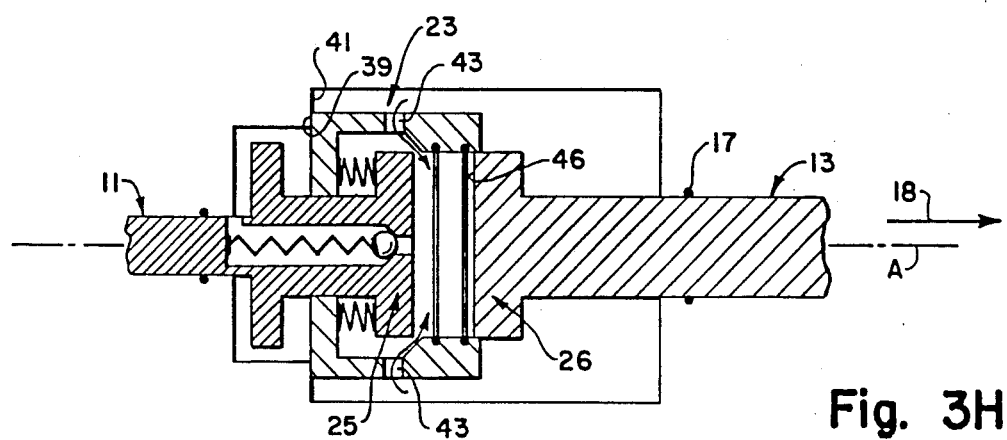

In the position of FIG. 3E, the forward motion of member 11 is halted wherein the check valve 29 is reseated under the force of the spring 33 to seal the gas remaining between the end portions 25 and 26 from fluid communication with the gas in the surrounding chamber 19. The first or restoring member 11 is then withdrawn or moved to the left from the position of FIG. 3E in the direction of arrow 16. This movement enlarges the volume of the gas remaining between the end portions 25 and 26; and, this movement from the second relative position of member 11 and 13 in FIG. 3E is continued until the pressure of the gas remaining between the end portions 25 and 26 is less than the gas pressure of the surrounding chamber 19 by a certain amount as illustrated in the position of FIG. 3F. At this point and as explained in more detail below, the net force on the member 13 is also to the left so that member 13 follows the leftward or restoring movement of the first member 11 while remaining substantially in the third relative position as shown in FIG. 3G and while substantially maintaining the same lesser pressure discussed below. The coordinated movement of the first and second members 11 and 13 in FIG. 3G continues until the shoulder 39 on the collar member 23 abuts the triggering shoulder 41 of the chamber 19. Continued movement of the first member 11 to the left as shown in FIG. 3H causes the collar member 23 to move relative to the end portion 25 of the member 11 to place the volume of gas remaining between the end portions 25 and 26 in fluid communication with the higher pressure gas in the surrounding chamber 19 via the passage or passages 43 in the collar member 23. The higher pressure of the gas in the surrounding chamber 19 then contacts the face 46 of the end portion 26 of the hammer member 13 and as explained in more detail below, the hammer member 13 is then accelerated to the right in FIG. 3H along axis A in a direction 18 opposite to the restoring direction 16 of FIG. 3F under the force of the higher pressure of the gas in the surrounding chamber 19. This movement of the hammer member 13 to the right in FIG. 3H continues until it impacts the chisel 7 of the jack hammer 1 in FIG. 2. The restoring member 11 is then advanced to the right to the position of FIG. 3A to initiate a second cycle. The cycle or stroke is then repeated and as discussed above, each individual cycle and each series of successive cycles are accomplished with the same constant and identical amount of gas in the closed system defined by the chamber 19 with its sealed outlets at 15 and 17. Consequently, the jack hammer 1 can be continuously operated in a repeating manner with a single charge of pressurized gas.

Referring to FIG. 3G, the reduced pressure $P_2$ between end portions 25 and 26 needed to cause the hammer member 13 to accelerate to the left and follow the restoring member 11 can be expressed by the equation:

$$A_2P_2 + F_{wt} + F_f + F_a = (A_2 - A_1)P_1 + A_1P_a$$

In this equation $A_2$ is the area of face 46, $F_{wt}$ is the force on member 13 due to gravity, $F_f$ is the friction force including the seal friction, $F_a$ is the force generated by accelerating member 13 due to its mass, A, is the area of the shaft 44 of the member 13 exposed to ambient pressure $P_a$, and $P_1$ is the pressure in the surounding chamber 19. At a $P_1$ of 1000 psi, a $P_2$ of 12 psi, a $F_{wt}$ of 4 lbs as well as a weight of 4 lbs, an acceleration of the member 13 of one g (approximately 32 ft/sec$^2$), an A, of 1 in$^2$, an $A_2$ of 4 in$^2$, and assuming no frictional forces $$A_2P_2 + F_{wt} + F_f + F_a = (A_2 - A_1)P_1 + A_1P_a$$

$$A_2P_2 = (A_1 - A_1)P_1 + A_1P_a - F_{wt} - F_a$$

$$P_2 = (A_2 - A_1)\frac{P_1}{A_2} + \frac{A_1P}{A_2} - \frac{F_{wt}}{A_2} - \frac{F_a}{A_2}$$

$$P_2 = (4in^2 - 1in^2)\frac{1000psi}{4in^2} + \frac{(1in^2)}{(4in^2)}12psi - \frac{4lbs}{4in^2} - \frac{F_a}{4in^2}$$

$$P_2 = 750psi + 3psi - 1psi - \frac{F_a}{4in^2}$$

$$P_2 = 750psi - \frac{F_a}{4in^2}$$

$$P_2 = 752psi - \frac{4lbs}{(1g)}\frac{(1g)}{4in^2} = 751psi$$

Consequently, reducing the pressure on the gas remaining between end portions 25 and 26 to 752 psi will place the member 13 in equilibrium and at a further reduced pressure of 751 psi, member 13 will be accelerated to the left at 1 g as in FIG. 3G to follow the restoring member 11. In this example, the maximum differential pressure across the seals 35 and 37 is then on the order of 249 psi and the volume expansion between FIGS. 3E and 3F is on the order of 30%–35%.

Embodiment of FIGS. 4A–E

FIGS. 4A–E illustrate a second embodiment of the present invention in which the steps of moving the first member toward the second into a sealing relationship after which the volume of the entrapped gas is reduced are eliminated so that the initial sealing engagement takes place when the volume of gas between the two members is at a minimum.

Figure 4A:
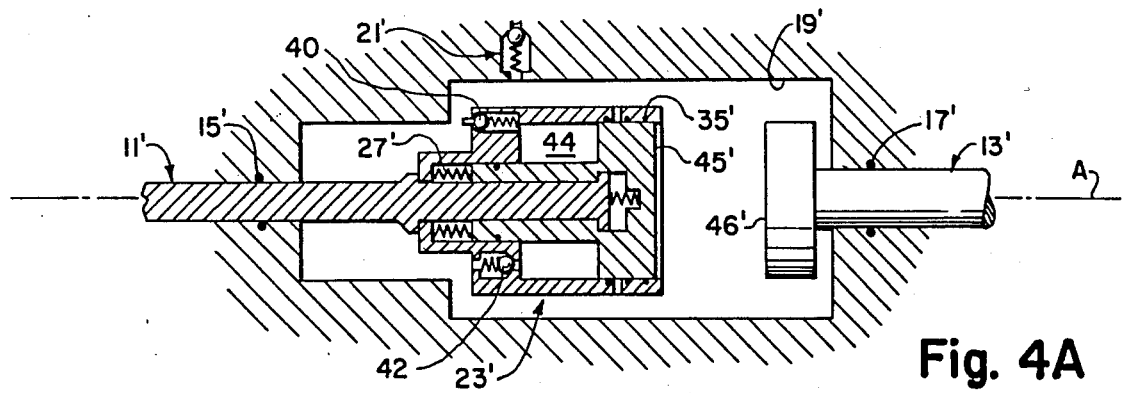
Figure 4B:
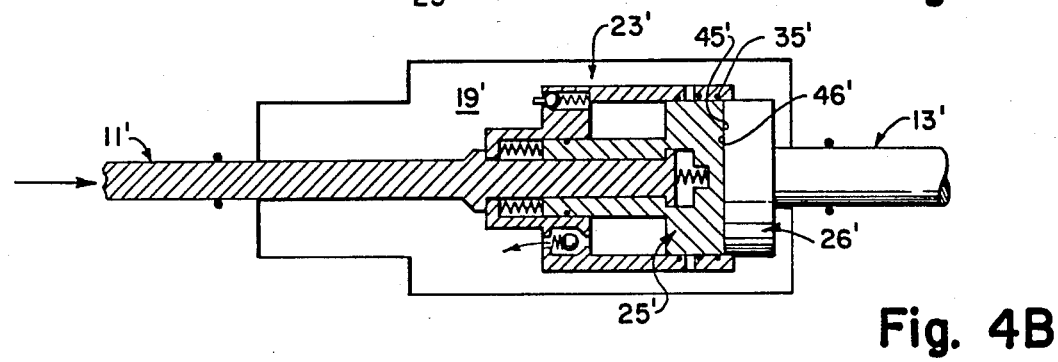
Figure 4C:
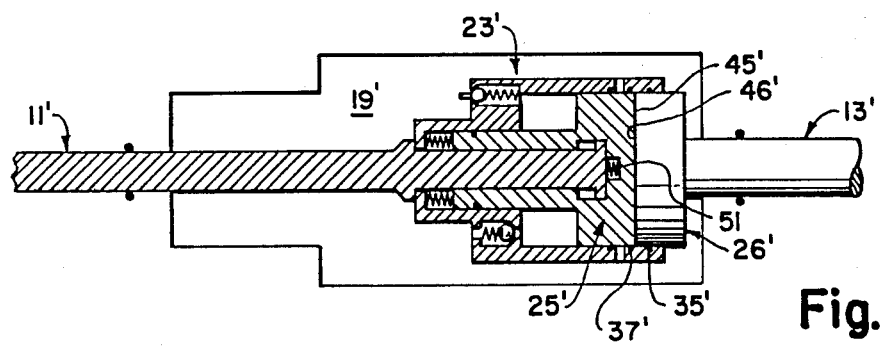
Figure 4D:
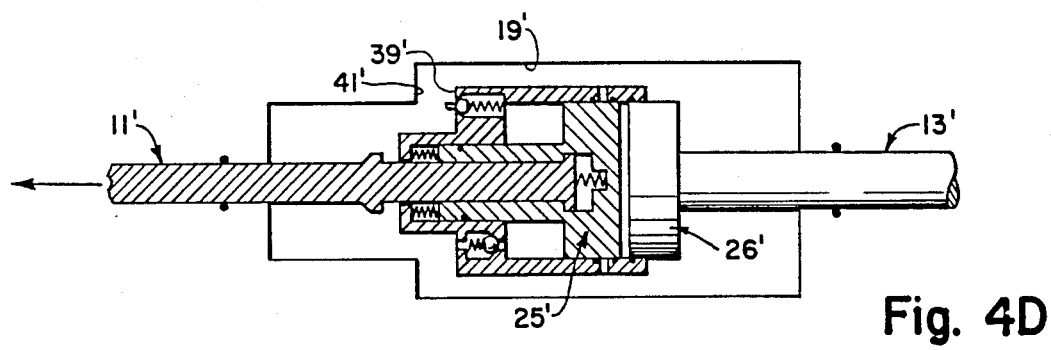

As in the preferred embodiment, the chamber 19' is initially pressurized with a gas through check valve 21';

and, as in FIGS. 3A-H, the check valve 21' is only shown in the first figure since once the chamber 19 with its sealed outlets at 15' and 17' is charged, it becomes a closed system with no gas leaving or entering the system during normal operation of the tool. As was the case with the preferred embodiment, the first member 11' is moved along the common axis A toward the second member 13' with springs 27' holding the collar member 23' in the position shown in FIG. 4A. In this position, the forward seal 35' on the collar member 23' is substantially flush or slightly behind the face 45' of the member 11'. The first member 11' is then advanced until the face 45' contacts the face 46' of the second member 13' as shown in FIG. 4B. At this point, the forward seal 35' is still substantially flush or slightly behind the face 46' and there is no sealing engagement between the end portions 25' and 26' of the members 11' and 13'.

Figure 4E:
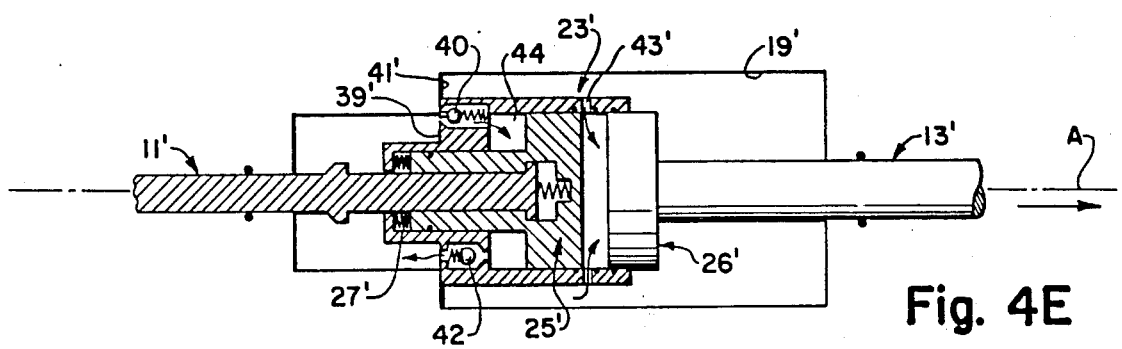

The forward movement of member 11' then continues whereupon the spring 51 is compressed advancing the collar 23' to the right and advancing the forward seal 35' beyond the abutting faces 45' and 46'. The forward and rearward seals 35' and 37' then sealingly engage the end portion 25' and 26' of the members 11' and 13' to define a first (although very small) volume gas between the end portions 25' and 26' as was the case in the preferred embodiment. From the position shown in FIG. 4C and as was also the case in the preferred embodiment, the first member 11' is then moved to the left enlarging the volume between the end portions 25' and 26' until the pressure of the gas therein is sufficiently less than the gas pressure surrounding the chamber 19' so that the net force on the member 13' is also to the left. Member 13' then follows the leftward or restoring movement of the first member 11'. This continues until the shoulder 39' of the collar member 23' strikes the triggering shoulder 41' of the chamber 19' wherein the passage 43' is moved to place the volume of gas between the end portions 25' and 26' in fluid communication with the higher pressure gas in the surrounding chamber 19'. The hammer member 13' is then accelerated to the right in FIG. 4E along axis A under the force of the higher pressure of the gas in the surrounding chamber 19. As in the preferred embodiment, the cycle is then repeated. The collar 23' has two valves at 40 and 42 to allow gas to pass between the chamber 19' and space 44'. Valve 42 is a check valve that operates under small pressure differentials (e.g., 1-2 psi) but valve 40 is mechanically operated and does not open under the influence of pressure differentials in normal operation of the tool. As best seen in FIG. 4E, valve 40 has a stem on it that abuts the surface 41' just before the shoulder 39' can then be re-positioned under the force of spring 27' as member 11' moves to the right from FIG. 4E to 4A.

c. Embodiment of FIGS. 5A-D

FIGS. 5A-D illustrate a third embodiment of the present invention which accomplishes the basic steps of FIGS. 3A-H but with the forward seal 35" on the collar member 23" sealing against the face 46" of the hammer member 13" rather than the sides as in the preferred embodiment of FIGS. 3A-H. Additionally, the embodiment of FIG. 5A-D uses a mechanically or electrically actuated valve 29" in place of the check valve 29 of the preferred embodiment of FIGS. 3A-H. For purposes of brevity, a detailed cycle is not shown in FIGS. 5A-D as in FIGS. 3A-H but for clarity, it is noted FIGS. 5A-D correspond to FIGS. 3A,D,G, and H respectively.

Figure 5A:
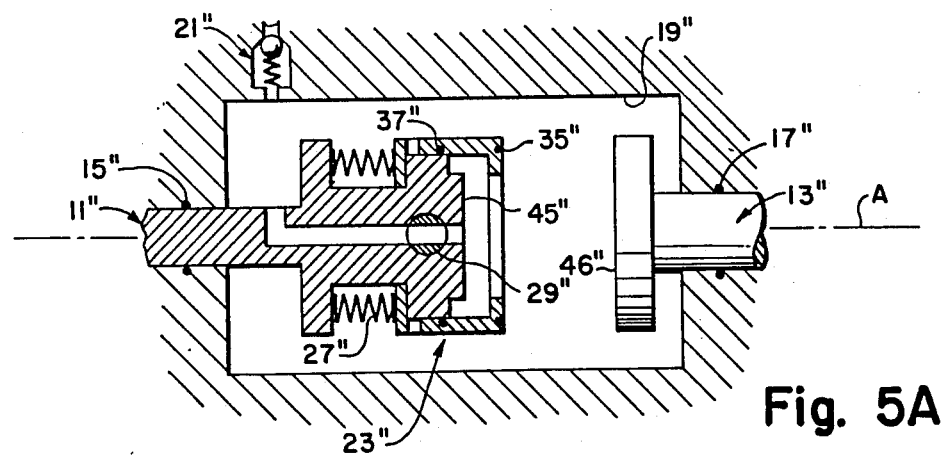

Referring to FIG. 5A, the chamber 19" is initially pressurized with a gas through a check valve 21" and as was the case with FIGS. 3A-H, the check valve 21" is only shown in FIG. 5A since once the chamaber 19" with its sealed outlets at 15" and 17" is charged, it becomes a closed system with no gas leaving or entering the system during normal operation of the tool. As was the case with the preferred embodiment, the first member 11" is moved along the common axis A toward the second member 13" with springs 27" holding the collar member 23" in the position shown in FIG. 5A. At this point, valve 29" can be open or shut but is preferably open for simplicity. Advancement of the first member 11" is then continued until the forward seal 35" on the collar member 23" abuts the face 46" of the second member 13". At this stage, the end portions 25" and 26" due to the forward and rearward seals 35" and 37" on the collar member 23" are sealingly engaged; and, the volume of gas between the end portion 25" and 26', and up the passage 31" to the location of valve 29" defines a first volume. This first volume unlike the first volume in the preferred embodiment of FIGS. 3A-H is not a sealed volume as the valve 29" is preferably open at this point.

Figure 5B:
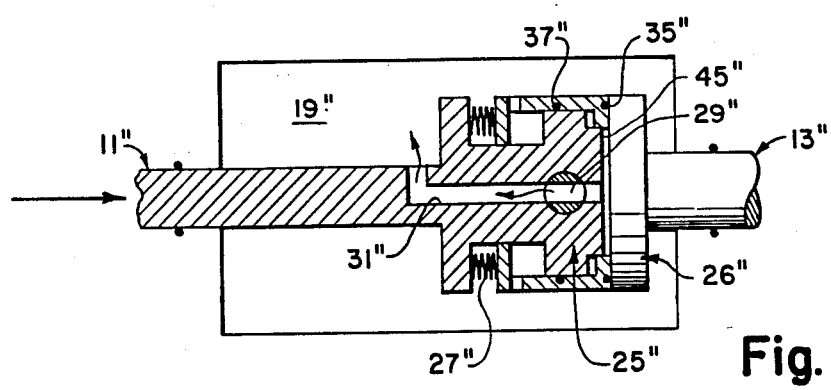
Figure 5C:
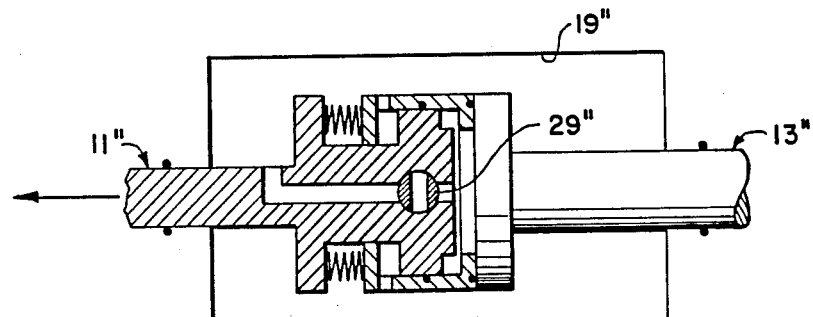
Figure 5D:
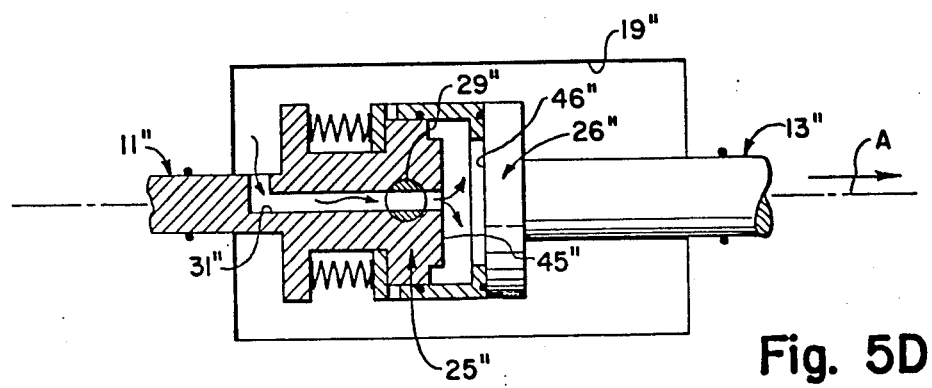

As in the preferred embodiment, the first volume is then reduced by continued movement of the first member 11" to the right in FIG. 5B raising the pressure of the gas in the first volume and displacing it through the valve 29" and passage 31" into the surrounding chamber 19". The forward movement of member 11" continues past FIG. 5B and is then halted with the faces 45" and 46" of the end portions 25" and 26" abutting or substantially abutting (as in FIG. 3E) and the springs 27" compressed whereupon the valve 29" is closed and the member 11" moved to the left (as in FIG. 3F) to enlarge the volume of the gas remaining between the end portions 25" and 26" until the pressure of the gas remaining therebetween is less than the gas pressure of the surrounding chamber 19" by a certain, predetermined amount. At this point and as explained above, the net force on the member 13" is such that the hammer member 13" follows the leftward or restoring movement of the first member 11" as illustrated in FIG. 5C. Once restored as shown in FIG. 5D, the valve 29" is opened placing the volume of gas remaining between the end portions 25" and 26" in fluid communication with the higher pressure gas in the surrounding chamber 19" via the passage 31" in the first member 11". The higher pressure of the gas in the surrounding chamber 19" then contacts the face 46" of the end portion 26" of the hammer member 13" and as in the preferred embodiment, the hammer member 13" is then accelerated to the right in FIG. 5D along axis A under the force of the higher pressure of the gas in the surrounding chamber 19". The cycle is then repeated and as was the case with the preferred embodiment, the system is a closed one so that successive cycles can be run off the initial charge of presssurized gas.

d. Embodiment of FIGS. 6A-I

Figure 6A:
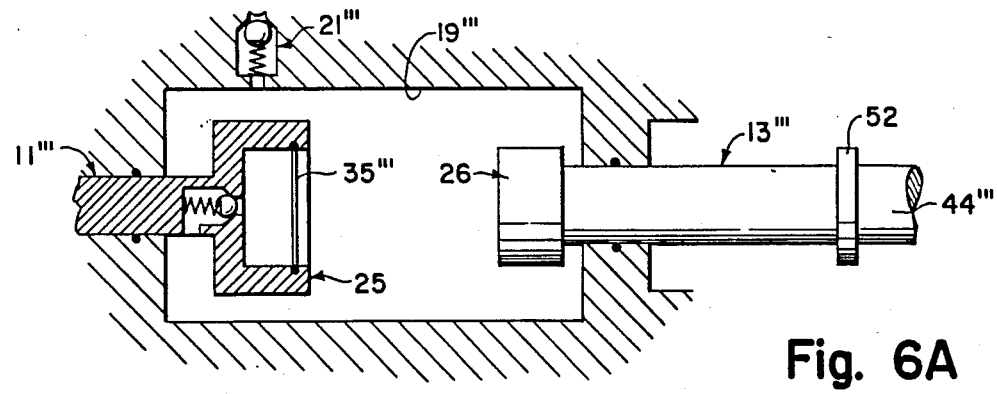
Figure 6B:
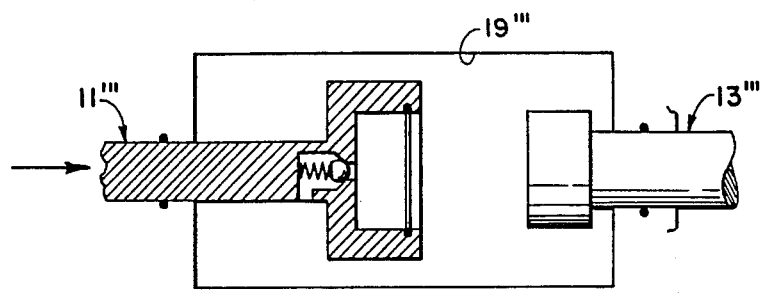
Figure 6C:
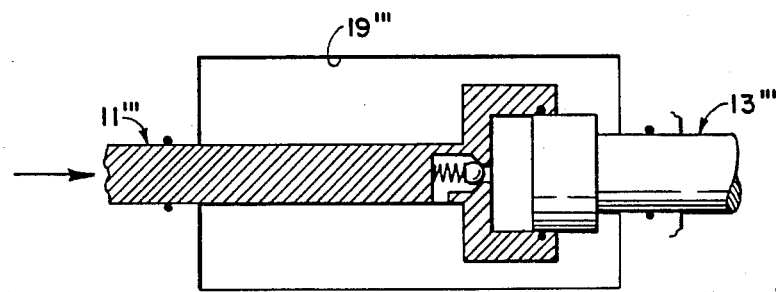
Figure 6D:
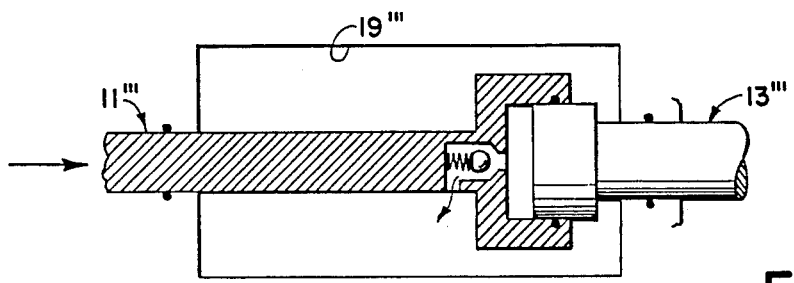
Figure 6E:
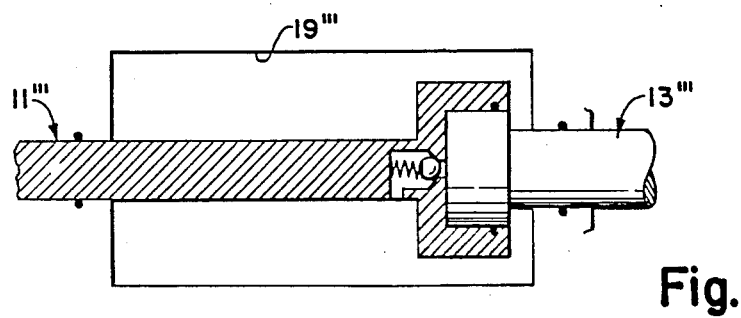
Figure 6F:
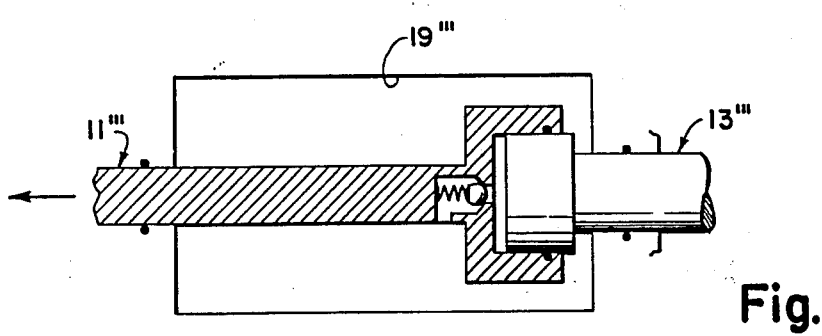
Figure 6G:
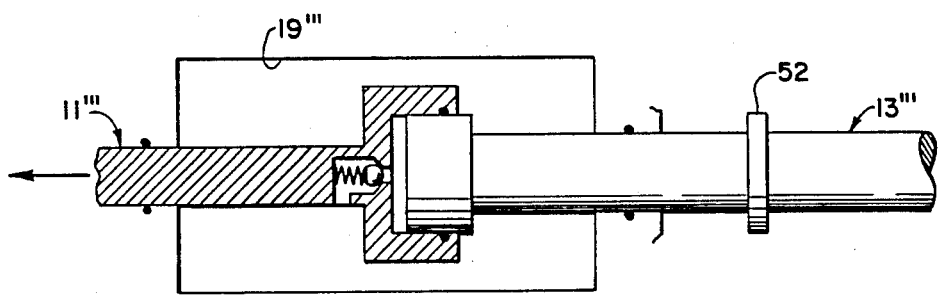
Figure 6H:
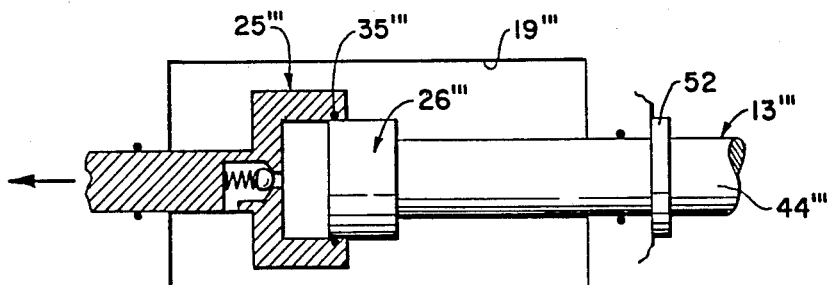
Figure 6I:
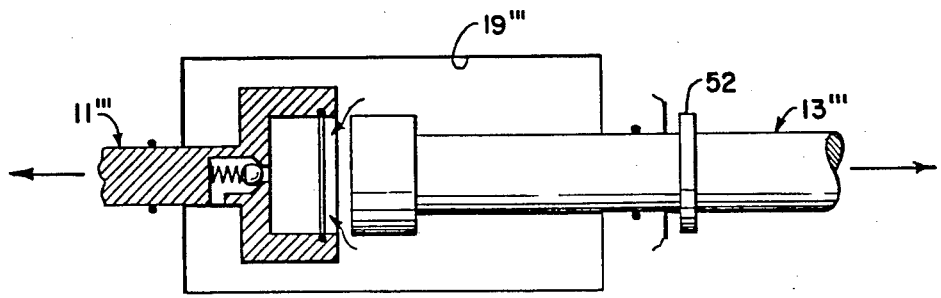
Figure 7A:
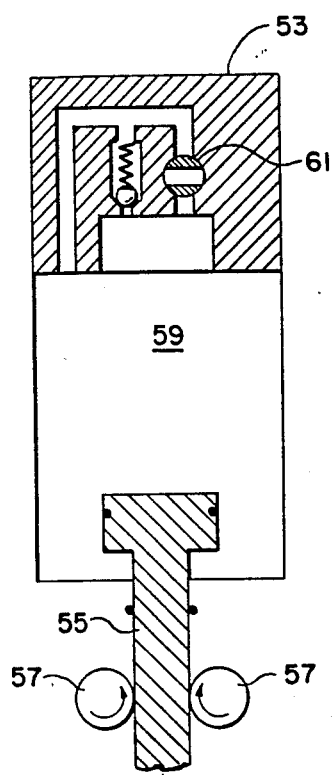
Figure 7B:
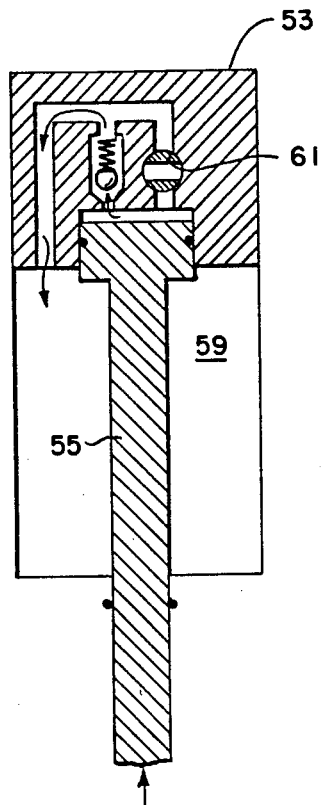
Figure 7C:
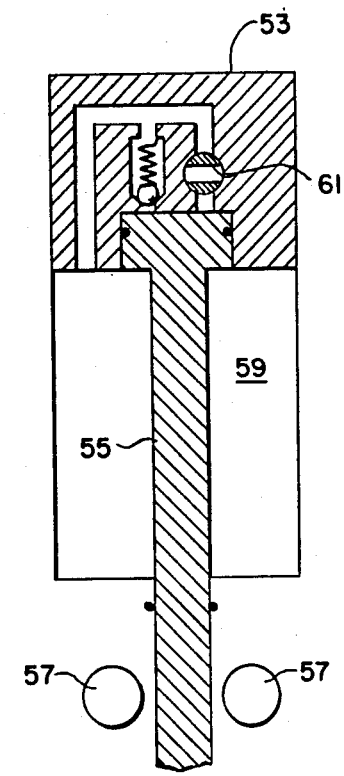
Figure 7D:
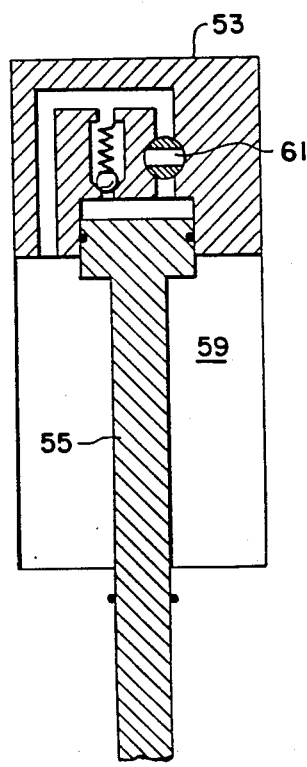
Figure 7E:
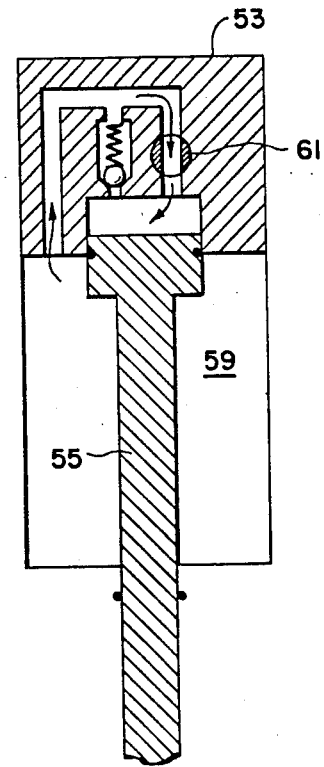
Figure 7F:
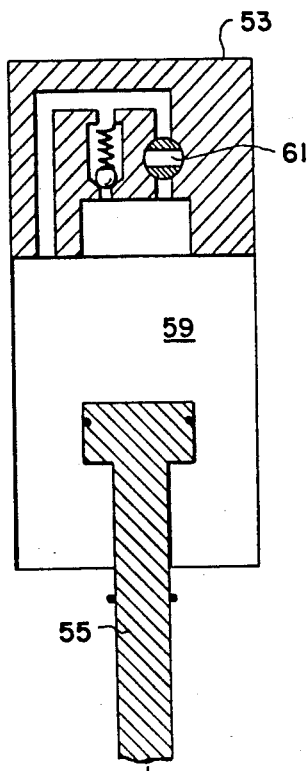
Figure 8A:
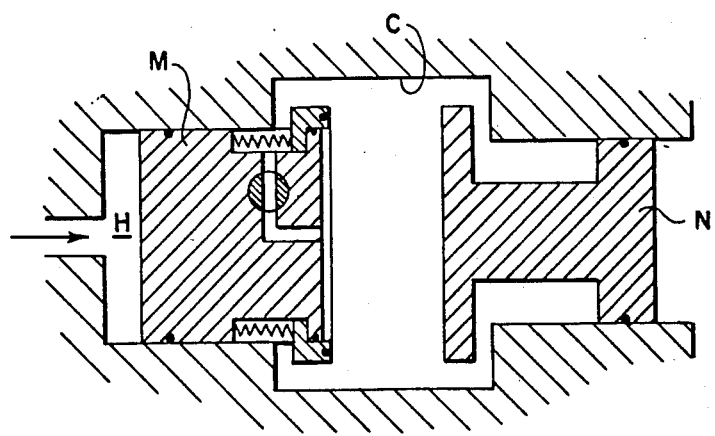
Figure 8B:
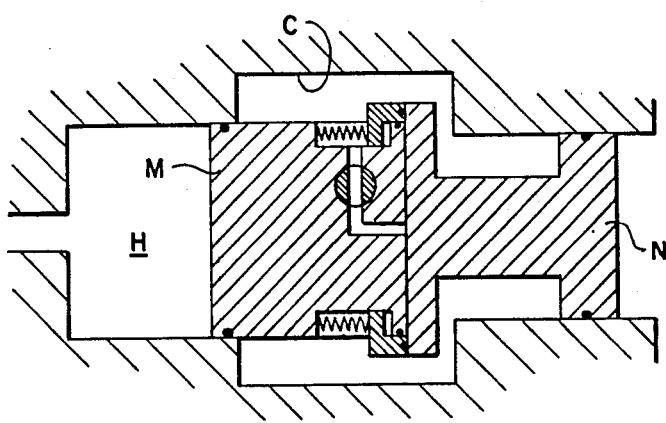
Figure 8C:
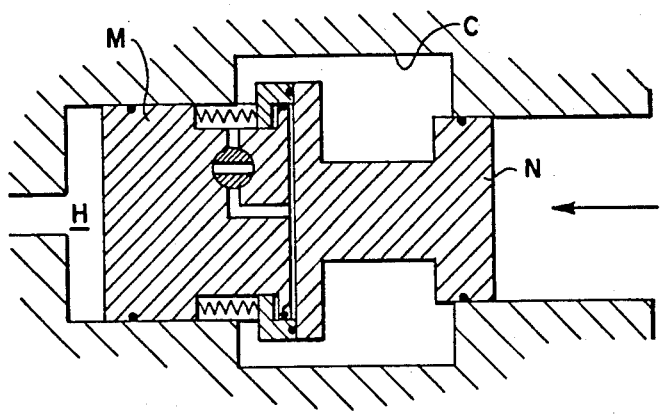
Figure 8D:
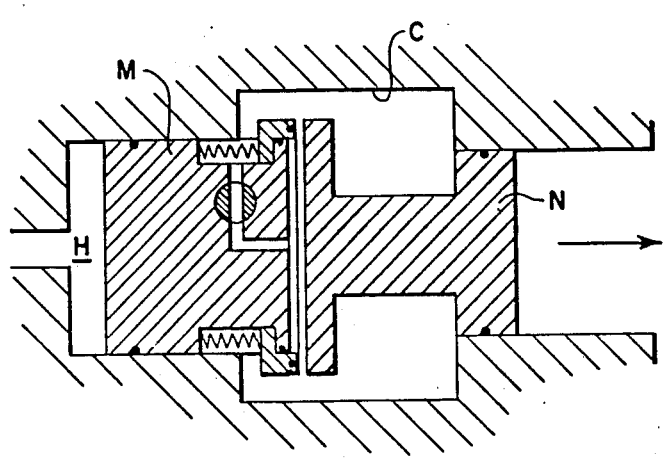

FIGS. 6A-I illustrate the full operational cycle of another embodiment of the present invention in which the basic steps of FIGS. 6A-G are the same as in the preferred embodiment of FIGS. 3A-G; however, the firing step in FIG. 6H is accomplished in a different manner. Specifically, stop 52 is provided on the shaft 44''' of hammer member 13''' so that the placing of the gas between the end portions 25''' and 26''' in fluid communication with the higher pressure gas in chamber 19''' for firing is accomplished by literally pulling the two members 11''' and 13''' apart. The major drawback of this embodiment as opposed to the others is that the seal 35''' is exposed to a higher pressure differential than is merely needed to restore the hammer member 13''' as illustrated in FIGS. 6F–G. As a result and based primarily on the state of the seal art, the embodiment of FIGS. 6A–I must be operated at a lower pressure in the chamber 19''' than in the other embodiments.

e. Embodiment of FIGS. 7A–F

FIGS. 7A–F illustrate another embodiment whose operating cycle is the same as the preferred embodiment of FIGS. 3A–H except for the fact that the first member 53 in this case is stationary with its female part facing into the chamber and the only moving member is the hammer member 55. Further, this embodiment requires that the hammer member 55 be restored by an external force such as friction wheels 57 which can then be moved away or disengaged prior to firing. Upon disengagement, the hammer member 55 under the pressure of the entrapped gas working against the lower ambient pressure on member 55 will expand the volume of the entrapped gas between the members 53 and 55 (FIG. D). This reduces its pressure below that in the surrounding chamber 59 wherein the member 55 is in equilibrium and can be fired by manipulation of the valve 61.

f. Embodiment of FIGS. 8A–D

FIGS. 8A–D illustrate an embodiment in which the first member M is moved to the right into sealing engagement with the member N under the force of a hydraulic fluid H under pressure. In a manner substantially similar to the embodiment of FIGS. 5A–D, a face seal is created between the members M and N, the entrapped gas is placed in fluid communication with the gas in chamber C (FIG. 8B), and the hydraulic fluid H is vented. The member M moves to the left under the pressure differential between the vented hydraulic fluid H on one side of member M and the gas entrapped between the members M and N on the other side. This leftward movement, enlarges the volume of entrapped gas reducing its pressure and resulting in a net force on the hammer member N to the left. The members M and N then move together as in FIG. 8C until communication is established in FIG. 8D between the high pressure gas in the surrounding chamber C and the entrapped gas between the members M and N as in the fashion of the other embodiments. Following such communication, the member N is then accelerated to the right in FIG. 8D to impact the chisel 7 or other working member of the tool.

II. FIGS. 9–13

FIGS. 9–13 illustrate adaptations of the basic invention to an environment in which the ambient or surrounding fluid is liquid 2 under high pressure (e.g., up to 7,000 psi or more) such as encountered in a wellbore 4. In contrast to the embodiments of FIGS. 1–8, all of the embodiments of FIGS. 9–13 use the high pressure of the ambient or surrounding fluid 2 to accelerate a mass (e.g., pistons members 6 and 6'). The accelerated mass, in turn, can then be used to impact a chisel such as 7' in FIG. 10. However, it can be equally and preferably adapted to generate acoustic signals such as 8 (see FIG. 9) for reception and recording by seismic equipment 10 at the surface. The recorded signals are then interpreted to provide structural and stratagraphic information about the subsurface material in the vicinity of the wellbore 4. In this light, the embodiments of FIGS. 9 and 11–13 will be described in operation as a source to generate acoustic signals; but, it is to be kept in mind that by adding a chisel such as 7' in FIG. 10 in sealing engagement 12 in the additional outlet 14 of the chamber 16, the fundamental operation of the embodiments of FIGS. 9 and 11–13 could be used in an impact tool.

In FIG. 9, the tool 18 of the embodiment of FIGS. 11A–G is shown in the environment of a surrounding liquid 2 under high pressure such as encountered in the wellbore 4. The wellbore 4 as shown as being encased but can be either cased or uncased. As discussed below, the tool 18 in this environment acts as a seismic energy source generating acoustic signals 8 for reception and recording by the surface instruments 10. The depth of the tool 18 in the wellbore 4 is adjusted by operation of the winch 22 which can selectively lower and raise the tool 18 as desired. In operation, the embodiment of FIGS. 11A–G and the embodiment of FIGS. 12A–H accelerate the pistons 6 and 6' under the force of the surrounding, high pressure liquid 2. The pistons 6 and 6' are then decelerated in a controlled manner to decelerate the adjacent liquid 2 thereby creating an acoustic signal. This is done much in the manner a waterhammer is created in a pipe when the flow of water is abruptly stopped.

a. Embodiment of FIGS. 9 and 11A–G

In operation of this embodiment as schematically shown in FIGS. 11A–G, the piston 6 is first sealingly mounted at 24 in the outlet 28 of the chamber 16 for movement along the axis A—A. The chamber 16 is then initially charged or pressurized with a gas through check valve 30 to a pressure less than the hydrostatic head of liquid 2 at the anticipated operating depth. This difference is preferably in the range of 1,000 psi to 2,000 psi (e.g., if the pressure of the liquid 2 at the anticipated operating depth is 4,000 psi, then the gas pressure is preferably 2,000–3,000 psi). For illustrative purposes, the check valve 30 is only shown in FIG. 11A as once the chamber 16 with its sealed outlet 28 is charged, it becomes a closed system with no gas leaving or entering the system during normal operation of the tool 18. In this manner, there is no need to provide an additional supply of compressed air to continuously or periodically re-charge the chamber 16 during normal operation of the tool 18.

Referring to FIG. 11B and once the chamber 16 is pressurized, the piston member 6 is moved, for example, by friction wheel 57 along the axis A toward the stationary, female member 32 in the direction of arrow 34. The chamber 16 and female member 32 are fixed relative to each other within the tool 18 as best seen in FIGS. 9 and 10 by the structure 36 with portals 36' (which are not shown in FIGS. 11A–G for clarity). In the position of FIG. 11B, the check valve 38 in the passage 48 of the female member 32 is biased by spring 50 in its closed position and valve 54 is also preferably closed. The piston member 6 is then further advanced until the seal 56 engages the female member 32. At this point, the first or end portions 58 and 60 of the members 6 and 32 are sealingly engaged to define a first, entrapped volume of liquid therebetween. The piston member 6 is then further advanced along the axis A toward the female member 32. This movement reduces the volume of the entrapped liquid raising its pressure and unseating the check valve 38 (see FIG. 11C) to place the liquid between the end portions 58 and 60 in fluid communication with the surrounding liquid 2.

The motion of member 6 in the direction of arrow 34 is thereafter halted (preferably after surfaces 63 and 64 of portions 58 and 60 fully abut) by removing the drive from friction wheels 57 wherein the check valve 38 is reseated under the force of spring 50 to seal the liquid remaining between the end portion 58 and 60 from fluid communication with the surrounding liquid 2. The piston member 6 then moves downwardly toward an equalibrium position under forces analogous to those set forth in regard to the embodiment of FIG. 3. This movement enlarges the volume of the liquid remaining between the end portions 58 and 60 and continues until the pressure of the liquid remaining between the end portions 58 and 60 is less than the high pressure of the surrounding liquid 2 by a determinable amount based on the forces acting on piston member 6. The piston member 6 remains in the equalibrium position of FIG. 11D until valve 54 is opened (see FIG. 11E) placing the volume of liquid remaining between the end portions 58 and 60 in fluid communication with the surrounding, high pressure liquid 2 via the passage 62 in the female member 32. The pressure of the liquid between the end portions 58 and 60 then rises and the piston 6 begins to move in the direction of arrow 66 until the sealing engagement is broken. The substantially higher pressure of the liquid 2 then contacts the face 63 of the end portion 58 of piston member 6. In a manner analogous to the embodiments of FIGS. 1-8, the piston member 6 is then accelerated under the force of the surrounding, high pressure liquid 2 along axis A in a direction 66 opposite to restoring direction 34 of FIG. 11B. This movement of the piston member 6 in FIG. 11F continues until the back part 68 of the head of the piston 6 nears the recessed, dash pot 70. At this point and as the part 68 displaces the liquid from the dash pot 70, the piston member 6 is decelerated in a controlled manner.

The dash pot 70 has a recessed, substantially concave portion extending about the axis A with sides 72 and annular, back surface 74. The sides 72 (which are really one continuous surface) are inclined to the axis A and extend outwardly of the axis A to a distance greater than the outward extent of the part 68 of the piston 6 which is received in the dash pot 70. In this manner, the surrounding liquid 2 in the dash pot 70 is displaced therefrom between the sides 72 and the, part 68 as the part 68 is received in the dash pot 70. The escape path of the liquid 2 being displaced gradually narrows due to the angle of the sides 72 wherein the piston 6 is decelerated in a controlled manner which is preferably linear. The decelerating piston 6 decelerates the surrounding liquid 2 immediately adjacent the portion 58 creating a waterhammer effect thereon which generates an acoustic signal or pulse in the surrounding liquid 2. By adjusting the parameters of the tool 18 as for example by adjusting the gas pressure in chamber 16 and the dimensions, angles, and shapes of the parts including the dash pot 70, the deceleration of the piston 6 can be modified to create any number of desired acoustic signals or pulses. The desired effect of the controlled deceleration of the piston 6 is to lengthen the time duration and modify the amplitude of the generated signal to thereby concentrate the generated acoustic energy in seismically useful frequences.

At the end of the cycle, the piston member 6 preferably abuts and is seated on the back 74 of the dash pot 70. This is preferably the rest position piston 6 assumes relative to the chamber 16 under the force generated on it by the high pressure of the surrounding liquid 2. From this rest position, the cycle or stroke can then be repeated by re-engaging and operating the friction wheels 57. As was the case with the embodiments of FIGS. 1–8, each individual cycle and each series of successive cycles are accomplished with the same constant and identical amount of gas in the closed system defined by the chamber 16 with its sealed outlet 28. Consequently the tool 18 can be continuously operated in a repeating manner with a single charge of pressurized gas.

b. Embodiment of FIGS. 12A–H

FIGS. 12A–H illustrate another adaption of the present invention for use in the environment of a high pressure surrounding liquid such as encountered in a wellbore. This embodiment accomplishes the basic steps of FIGS. 11A–G except that the member 32' is movably mounted and is used to restore the piston 6'. More specifically, the chamber 16 in FIG. 12A is charged with gas through check valve 32 as in FIG. 11A but, thereafter, the piston 6' is moved to its firing position of FIG. 12F by member 32'.

Referring to FIGS. 12A–H, the piston 6' assumes its rest position of FIG. 12A under the force of the high pressure of the ambient or surrounding liquid 2. Thereafter, member 32' is moved along axis A—A under the force of friction wheels 76 (see FIG. 12B) until the seal 78 engages the end portion 58' of piston member 6'. At this point, the first or end portions 58' and 60' of the members 6' and 32' are sealingly engaged in a first relative position to define a first volume of liquid therebetween which is preferably entrapped with valves 38' and 54' both closed. The member 32' is then further advanced along the axis A to reduce the volume of the entrapped liquid raising its pressure and unseating the check valve 38' (see FIG. 12C) to place the liquid between the end portions 58' and 60' in fluid communication with the surrounding liquid 2. The motion of member 32' in the direction of arrow 80 is thereafter halted at a second relative position (preferably when surfaces 63' and 64' of the portions 58' and 60' fully abut) by removing the drive from friction wheels 76. The check valve 38' is then reseated under the force of spring 50' to seal any liquid remaining between the end portions 58' and 60' from fluid communication with the surrounding liquid 2.

In contrast to the embodiment of FIGS. 11A–G, the restoring member 32' is then withdrawn or moved upwardly from the position of FIG. 12D by reversing the drive of wheel 76. This movement enlarges the volume of the liquid remaining between the end portions 58' and 60' and is continued until the pressure of the liquid remaining between the end portions 58' and 60' is less than the high pressure of the surrounding liquid 2 by a determinable amount as discussed in regard to the embodiment of FIG. 3. At this point, the net force on the piston 6' is also upwardly so that it follows the upward or restoring movement of the member 32' while remaining substantially in the third relative position shown in FIG. 12E and while substantially maintaining the same lesser pressure between the end portions 58' and 60'. The coordinated movement of the members 32' and 6' continues until movement of member 32' is stopped and valve 54' opened. Once the valve 54' is open in FIG. 12F, the pressure of the, liquid between the end portions 58' and 60' rises and the piston 6' begins to move in the direction of arrow 66' until the sealing engagement is broken. The substantially higher pressure of the liquid 2 then contacts the face 63' of the end portion 58' of the piston member 6'. Alternately, the breaking of the seal and exposure of the surface 63' to the higher pressure of liquid 2 could be automatically done by any of the triggering mechanisms of FIGS. 3-5 or 8. In any event and in a manner analogous to the embodiment of FIG. 11, the piston member 6' is then accelerated under the force of the surrounding, high pressure liquid 2 along axis A in a direction 66' opposite to the restoring direction 34' of FIG. 12E. As in the case of FIG. 11, this movement of the piston member 6' in FIG. 12G continues until the back part 68' of the head of the piston 6' nears the recessed, dash pot 70'. At this point and as the part 68' displaces the liquid from the dash pot 70, the piston member 6' is decelerated in a controlled manner creating a waterhammer effect on the surrounding liquid 2 and generating an acoustic signal or pulse in the surrounding liquid 2.

c. FIG. 13

FIG. 13 illustrates an arrangement for adjusting or regulating the pressure of the gas in the chamber 16 as the modified tool 18' is lowered deeper into the wellbore 4 by the winch 22. In this manner, the difference between the gas pressure in the chamber 16 and the higher pressure of the surrounding liquid 2 can be maintained substantially constant (e.g., 2,000 psi) for more uniform operation of the tool 18' at all depths within the liquid 2. As a result of this pressure compensation, the energy level and the shape of this generated acoustic signal or pulse can be maintained substantially independent of the hydrostatic head.

In operation as shown in FIG. 13, a high pressure reservoir 16' of gas is provided in the tool 18'. The reservoir 16' is connected by lines 82 and 84 to chamber 16 with shuttle valve 86 being positioned inbetween. The spring 88 and the pressure on the upper side of the shuttle valve 86 which is exposed to the chamber 16 by line 90 biases the shuttle valve 86 in the position shown. As the tool 18' is lowered, the pressure of the surrounding liquid 2 increases. This increases the upward force on the bottom side of the shuttle valve 86 which is exposed by line 92 to the surrounding liquid 2. As the pressure of the surrounding liquid 2 continues to increase, the shuttle valve 86 is raised placing lines 82 and 84 in fluid communication across the valve 86 wherein high pressure gas from the reservoir 16' can flow into chamber 16. This flow continues until the forces on the shuttle valve 86 return it to the position shown in FIG. 13. In this manner, the pressure of the gas chamber 16 is automatically adjusted as the tool is lowered to maintain the difference between the gas pressure in chamber 16 and the surrounding liquid 2 substantially constant. As discussed above, this results in a more uniform operation of the tool 18' at all depths within the liquid wherein the energy level, and the shape of the generated acoustic signal or pulse is substantially the same and substantially independent of the hydrostatic head at any depth in the wellbore 4. The structure of FIG. 13 is designed for use with the tool 18' in operation as it is being lowered. If the tool is operated as it is being raised, the working parts of FIG. 13 would essentially be reversed with chamber 16' being a low pressure sink.

In regard to FIGS. 9-13, the preferred embodiment is that of FIGS. 12A-H as modified to contain the pressure compensator of FIG. 13.

While several embodiments of the invention have been disclosed in detail, it is to be understood that changes and modifications may be made to them without departing from the scope of the invention.

I claim:

1. A method for accelerating a mass in the environment of a surrounding liquid under high pressure such as in a wellbore, said method including the steps of:
    (a) providing a chamber having at least one outlet,
    (b) mounting a member in a sealing relationship in said one outlet for movement along an axis relative to said chamber,
    (c) pressurizing said chamber with a gas at a pressure less than the pressure of the surrounding liquid, said member having a first portion exposed to said liquid and said member assuming a first position relative to said chamber under the force generated on the member by the high pressure of the surrounding liquid,
    (d) moving said member along said axis in a first direction away from said first position,
    (e) sealing said first portion of said member from exposure to the surrounding liquid,
    (f) reducing the pressure on said first portion of the member to a pressure less than the high pressure of the surrounding liquid, and
    (g) placing said first portion of the member in fluid communication with the surrounding, high pressure liquid to accelerate said member along said axis toward said first position in a direction opposite to said first direction.

2. The method of claim 1 wherein said chamber encloses a space and said method further includes the step of preventing any gas from leaving said enclosed space during steps (d)–(g).

3. The method of claim 1 wherein said chamber encloses a space and said method includes the further step of maintaining a constant and identical amount of gas within said enclosed space during steps (d)–(g).

4. The method of claim 1 further including the step of (h) decelerating said member as said member approaches said first position by receiving a part of said member in another member having a recessed, substantially concave portion extending about said axis whereby said decelerating member decelerates the liquid adjacent thereto creating an acoustic signal in the surrounding liquid.

5. The method of claim 1 further including the step of mounting an other member at a location spaced along said axis from said one outlet and step (e) further including the limitations of (e) (1) sealingly engaging the first portion of said first mentioned member and a first portion of the other member together to define a first volume of liquid therebetween and (e) (2) sealing the liquid between the first portions from fluid communication with the surrounding liquid.

6. The method of claim 5 wherein step (f) includes the further limitation of reducing the pressure on the first portion of the first mentioned member to said pressure less than the high pressure of the surrounding liquid by enlarging the volume of the liquid between the first portions until the pressure of the liquid therebetween is less than the high pressure of the surrounding liquid.

7. The method of claim 5 further including the limitations of maintaining the sealing engagement of steps (e)(1) and the sealing of (e)(2) while increasing the pressure of the liquid between said first portions by reducing the size of said first volume to a smaller, second volume, then placing the liquid between the first portions in fluid communication with the surrounding liquid, and then sealing the remaining liquid between said first portions from fluid communication with the surrounding liquid.

8. The method of claim 1 further including the limitation of mounting an other member at a location spaced along said axis from said one outlet, and step (e) includes the further limitation of sealingly engaging said first portion of said first mentioned member to a first portion of said other member to define a closed volume of liquid therebetween.

9. The method of claim 1 further including the steps of adjusting the depth of said chamber and member in said liquid and maintaining a substantially constant difference between the gas pressure and the pressure of the surrounding liquid by adjusting the pressure of the gas in said chamber as the depth is adjusted whereby the operation of the method is substantially uniform at all depths within the liquid.

10. The method of claim 9 wherein said maintaining step includes the limitation of increasing said gas pressure as the pressure of the liquid increases.

11. A method for accelerating a mass in the environment of a surrounding liquid under high pressure such as in a wellbore, said method including the steps of:
  (a) providing a chamber having at least one outlet,
  (b) mounting a member in a sealing relationship in said one outlet for movement along an axis relative to said chamber,
  (c) pressurizing said chamber with a gas at a pressure less than the pressure of the surrounding liquid, said member having a first portion exposed to said liquid and said member assuming a first position relative to said chamber under the force generated on the member by the high pressure of the surrounding liquid,
  (d) sealing said first portion of said member from exposure to the surrounding liquid,
  (e) reducing the pressure on said first portion of the member to a pressure less than the high pressure of the surrounding liquid,
  (f) moving said member along said axis in a first direction away from said first position, and
  (g) placing said first portion of the member in fluid communication with the surrounding, high pressure liquid to accelerate said member along said axis toward said first position in a direction opposite to said first direction, 12. The method of claim 11 wherein said chamber encloses a space and said method further includes the step of preventing any gas from leaving said enclosed space during steps (d)-(g).

13. The method of claim 11 wherein said chamber encloses a space and said method includes the further step of maintaining a constant and identical amount of gas within said enclosed space during steps (d)-(g).

14. The method of claim 11 further including the step of (h) decelerating said member as said member approaches said first position by receiving a part of said member in another member having a recessed, substantially concave portion extending about said axis whereby said decelerating member decelerates the liquid adjacent thereto creating an acoustic signal in the surrounding liquid.

15. The method of claim 11 further including the step of mounting an other member at a location spaced along said axis from said one outlet, and step (d) further including the limitations of (d)(1) sealingly engaging the first portion of said first mentioned member and a first portion of the other member together to define a first volume of liquid therebetween and (d)(2) sealing the liquid between the first portions from fluid communication with the surrounding liquid.

16. The method of claim 15 wherein step (e) includes the further limitations of reducing the pressure on the first portion of the first mentioned member to said pressure less than the high pressure of the surrounding liquid by enlarging the volume of the liquid between the first portions until the pressure of the liquid therebetween is less than the high pressure of the surrounding liquid.

17. The method of claim 16 further including the step of mounting said other member for movement along said axis relative to said chamber and step (f) includes the further limitation of moving both of the members along said axis in said first direction while maintaining said lesser pressure in the liquid between the first portion of said members.

18. The method of claim 15 further including the limitations of maintaining the sealing engagement of steps (d)(1) and the sealing of (d)(2) while increasing the pressure of the liquid between said first portions by reducing the size of said first volume to a smaller, second volume, then placing the liquid between the first portions in fluid communication with the surrounding liquid, and then sealing the remaining liquid between said first portions from fluid communication with the surrounding liquid.

19. The method of claim 11 further including the limitation of mounting an other member at a location spaced along said axis from said one outlet, and step (d) includes the further limitation of sealingly engaging said first portion of said first mentioned member to a first portion of said other member to define a closed volume of liquid therebetween.

20. The method of claim 11 further including the steps of adjusting the depth of said chamber and member in said liquid and maintaining a substantially constant difference between the gas pressure and the pressure of the surrounding liquid by adjusting the pressure of the gas in said chamber as the depth is adjusted whereby the operation of the method is substantially uniform at all depths within the liquid.

21. The method of claim 20 within said maintaining step includes the limitation of increasing the gas pressure as the pressure of the liquid increases.

* * * * *